United States Patent
Matsuura et al.

(10) Patent No.: US 10,408,278 B2
(45) Date of Patent: Sep. 10, 2019

(54) CLUTCH SYSTEM HYDRAULICALLY CONTROLLING AXIAL SLIDE ACTION OF CLUTCH SLIDER

(71) Applicant: KANZAKI KOKYUKOKI MFG. CO., LTD., Amagasaki-shi, Hyogo (JP)

(72) Inventors: Jun Matsuura, Amagasaki (JP); Koji Iwaki, Amagasaki (JP)

(73) Assignee: KANZAKI KOKYUKOKI MFG. CO., LTD., Amagasaki-Shi, Hyogo (JP)

( * ) Notice: Subject to any disclaimer, the term of this patent is extended or adjusted under 35 U.S.C. 154(b) by 523 days.

(21) Appl. No.: 15/079,670

(22) Filed: Mar. 24, 2016

(65) Prior Publication Data

US 2016/0281821 A1 Sep. 29, 2016

(30) Foreign Application Priority Data

Mar. 26, 2015 (JP) ................................ 2015-065346
Mar. 30, 2015 (JP) ................................ 2015-069636

(51) Int. Cl.
*F16D 11/14* (2006.01)
*B60K 17/10* (2006.01)
(Continued)

(52) U.S. Cl.
CPC .............. *F16D 11/14* (2013.01); *B60K 17/10* (2013.01); *B60K 17/34* (2013.01); *F16H 47/02* (2013.01);
(Continued)

(58) Field of Classification Search
CPC ........ F16D 21/04; F16D 25/061; F16D 25/10; F16D 48/0206; F16D 48/062;
(Continued)

(56) References Cited

U.S. PATENT DOCUMENTS 3,424,285 A * 1/1969 McRay ................... F16D 67/04
188/151 R
6,315,691 B1 * 11/2001 Fredriksen ............ F16D 25/061
192/48.613
(Continued)

FOREIGN PATENT DOCUMENTS

JP H06341462 A 12/1994
JP H0914293 A 1/1997
(Continued)

OTHER PUBLICATIONS

JPO Notification of Reasons for Refusal corresponding to JP Application No. 2015-065346; dated Aug. 28, 2018.
(Continued)

*Primary Examiner* — Jacob S. Scott
*Assistant Examiner* — Lori Wu
(74) *Attorney, Agent, or Firm* — Cantor Colburn LLP

(57) ABSTRACT

A clutch system includes a transmission shaft, a gear, and a clutch slider. The gear is provided on the transmission shaft rotatably relative to the transmission shaft. The clutch slider is provided on the transmission shaft axially slidably along the transmission shaft and unrotatably relative to the transmission shaft. The gear and the clutch slider are provided with respective clutch teeth. The clutch system is set in either a clutch-on state where the clutch teeth of the gear engage with the clutch teeth of the clutch slider or a clutch-off state where the clutch teeth of the gear disengage from the clutch teeth of the clutch slider. The clutch system is provided with a hydraulic control system to hydraulically control the respective axial slide actions of the clutch slider in a clutch-on direction for realizing the clutch-on state and in a clutch-off direction for realizing the clutch-off state.

2 Claims, 12 Drawing Sheets

(51) Int. Cl.
*F16H 47/02* (2006.01)
*B60K 17/34* (2006.01)
*F16H 63/30* (2006.01)
*F16D 121/02* (2012.01)

(52) U.S. Cl.
CPC ..... *F16H 63/3023* (2013.01); *F16D 2121/02* (2013.01)

(58) Field of Classification Search
CPC ..... F16D 11/14; F16H 63/3023; B60K 17/10; B60K 17/105
See application file for complete search history.

(56) References Cited

U.S. PATENT DOCUMENTS

| | | | |
|---|---|---|---|
| 7,845,453 | B2 | 12/2010 | Nishimoto et al. |
| 8,256,558 | B2 | 9/2012 | Hasegawa et al. |
| 2009/0078083 | A1 | 3/2009 | Nishimoto |
| 2009/0280945 | A1* | 11/2009 | Brandemuehl ....... F16H 37/042 475/123 |
| 2010/0184551 | A1* | 7/2010 | Hiraoka ................ F16H 47/04 475/80 |
| 2011/0039653 | A1 | 2/2011 | Hasegawa et al. |
| 2011/0220057 | A1 | 9/2011 | Fujimoto et al. |

FOREIGN PATENT DOCUMENTS

| | | |
|---|---|---|
| JP | 2002188113 A | 7/2002 |
| JP | 2005090664 A | 4/2005 |
| JP | 2007056996 A | 3/2007 |
| JP | 2007120572 A | 5/2007 |
| JP | 2009073371 A | 4/2009 |
| JP | 2009166681 A | 7/2009 |
| JP | 2011185225 A | 9/2011 |

OTHER PUBLICATIONS

JPO Notification of Reasons for Refusal corresponding to JP Application No. 2015-069636; dated Jul. 24, 2018.

* cited by examiner

CLUTCH SYSTEM HYDRAULICALLY CONTROLLING AXIAL SLIDE ACTION OF CLUTCH SLIDER

CROSS-REFERENCE TO RELATED APPLICATIONS

The present application claims priority to Japanese Patent Applications No. 2015-65346, filed on Mar. 26, 2015, and No. 2015-69636, filed on Mar. 30, 2015.

BACKGROUND OF THE INVENTION

Field of the Invention

The present invention relates to a clutch system, especially, which is adaptable to a speed shifter.

Related Art

A conventional speed shift device using a dog clutch type shifter to transmit power from an input part to an output part via a gear train selected among different speed gear trains needs a mechanical link system for operating a slide action of a slidable member of the shifter (i.e., a clutch slider). As disclosed by JP 2009-73371 A, for example, a typical mechanical link system includes a fork engaging with the clutch slider, and a fork shaft pivoting the fork. The fork shaft is axially slidably supported in a transmission casing (e.g., a transaxle casing).

To provide the conventional dog clutch type shifter, the transmission casing (transaxle casing) needs to have a space for axially slidably supporting the fork shaft parallel to a gear shaft constituting the gear trains, thereby increasing component parts in number and cost, and thereby hindering a transmission (e.g., a transaxle) from being minimized.

SUMMARY OF THE INVENTION

An object of the invention is to provide a clutch system configured to solve the above-mentioned problem.

A clutch system according to the invention includes a transmission shaft, a gear, and a clutch slider. The gear is provided on the transmission shaft rotatably relative to the transmission shaft. The clutch slider is provided on the transmission shaft axially slidably along the transmission shaft and unrotatably relative to the transmission shaft. The gear and the clutch slider are provided with respective clutch teeth. The clutch system is set in either a clutch-on state where the clutch teeth of the gear engage with the clutch teeth of the clutch slider or a clutch-off state where the clutch teeth of the gear disengage from the clutch teeth of the clutch slider. The clutch system is provided with a hydraulic control system to hydraulically control the respective axial slide actions of the clutch slider in a clutch-on direction for realizing the clutch-on state and in a clutch-off direction for realizing the clutch-off state.

Therefore, the clutch system does not need a mechanical link system, e.g., a fork and a fork shaft, for operating the axial slide action of the clutch slider. As a result, the clutch system is advantageous to minimize an apparatus including the clutch system (e.g., a transmission or a transaxle including a speed shift transmission using the clutch system).

Preferably, the clutch system includes first and second gears each of which serves as said gear, and includes first and second clutch sliders each of which serves as said clutch slider. The first and second clutch sliders are disposed between the first and second gears. The hydraulic control system hydraulically controls the axial slide actions of the first clutch slider in the clutch-on and clutch-off directions and the axial slide actions of the second clutch slider in the clutch-on and clutch-off directions so as to realize either a first clutch-on state where the clutch teeth of the first gear engage with the clutch teeth of the first clutch slider or a second clutch-on state where the clutch teeth of the second gear engage with the clutch teeth of the second clutch slider in such a way that the first clutch-on state and the second clutch-on state are contradictory to each other.

Therefore, the clutch system is adaptable to a speed shifter provided with a high speed gear and a low speed gear serving as the first and second gears, for example.

Further preferably, a common guide member connects the first and second clutch sliders to each other.

Therefore, on an assumption that a later-discussed biasing device is provided, when one clutch slider is set in the clutch-on state, a clutch-off state of the other clutch slider can be kept in association with the clutch-on state of the one clutch slider. As a result, the hydraulic control system surely keeps the contradiction of the first and second clutch-on states so as not to realize both the first clutch-on state and the second clutch-on state simultaneously.

Further preferably, the common guide member is provided with a biasing device that biases the first and second clutch sliders in the respective clutch-off directions. The hydraulic control system applies a hydraulic pressure to either the first or second clutch slider so that the first or second clutch slider receiving the hydraulic pressure slides in the clutch-on direction against a biasing force of the biasing device.

Therefore, once a fluid supplied for applying the hydraulic pressure is released, the first or second clutch slider having been set in the clutch-on state naturally slides in the clutch-off direction by the biasing force of the biasing device, thereby smoothly realizing the clutch-off state. The guide member connecting the first and second clutch sliders to each other applies the biasing force of the biasing device to both the first and second clutch sliders. As a result, the first and second clutch sliders do not need respective separate biasing devices, thereby reducing component parts in number and cost.

Preferably, the guide member is provided with a first restriction device and a second restriction device. The first restriction device prevents the first clutch slider from sliding beyond a predetermined degree in the clutch-on direction of the first clutch slider. The second restriction device prevents the second clutch slider from sliding beyond a predetermined degree in the clutch-on direction of the second clutch slider.

Therefore, the single guide member is used to restrict the respective sliding degrees of the first and second clutch sliders in the respective clutch-on directions without increase of component parts in number or complicated processing of the transmission shaft, thereby reducing costs.

Preferably, when the clutch system equipped on a vehicle is set in either the first or second clutch-on state, the set first or second clutch-on state is kept unless the vehicle is recognized as stationary.

Therefore, for example, if the clutch system is adapted to a speed shifter including high and low speed gears serving as the first and second gears, the clutch teeth are prevented from being damaged by a rotary speed difference between the transmission shaft and the gear, which may occur when the clutch system is operated for speed shift during travel of the vehicle. In other words, the speed shift operation of the clutch system is performed only when the vehicle is stationary so as to be free from a fear of the rotary speed difference.

Alternatively, preferably, when the clutch system equipped on a vehicle is operated to be shifted between the first clutch-on state and the second clutch-on state during travel of the vehicle, the respective clutch teeth of the first or second gear and the first or second clutch slider having engaged with each other before the shift operation of the clutch system are disengaged from each other, and then, the target first or second clutch slider to have its clutch teeth engaged after the shift operation of the clutch system slides in its clutch-on direction once a rotary speed of the transmission shaft becomes equal to a rotary speed of the first or second gear to have its clutch teeth engaged with the clutch teeth of the target first or second clutch slider.

Therefore, for example, if the clutch system is adapted to a speed shifter including high and low speed gears serving as the first and second gears, the clutch teeth are prevented from being damaged by a rotary speed difference between the transmission shaft and the gear, thereby enabling the high-and-low speed shift operation even during travel of the vehicle.

Alternatively, preferably, when the clutch system equipped on a vehicle is set in either the clutch-on state or the clutch-off state, the set clutch-on or clutch-off state is kept unless the vehicle is recognized as stationary.

Therefore, the clutch teeth are prevented from being damaged by a rotary speed difference between the transmission shaft and the gear, which may occur when the clutch system is operated to be shifted between the clutch-on state and the clutch-off state during travel of the vehicle. In other words, the clutch shift operation of the clutch system is performed only when the vehicle is stationary so as to be free from a fear of the rotary speed difference.

These and other objects, features and advantages of the invention will appear more fully from the following detailed description of the invention with reference to the attached drawings.

BRIEF DESCRIPTION OF THE DRAWINGS

FIG. 9 is a sectional side view of a differential unit 9 provided with a differential locking system 9a.

DETAILED DESCRIPTION OF THE INVENTION

Figure 1:
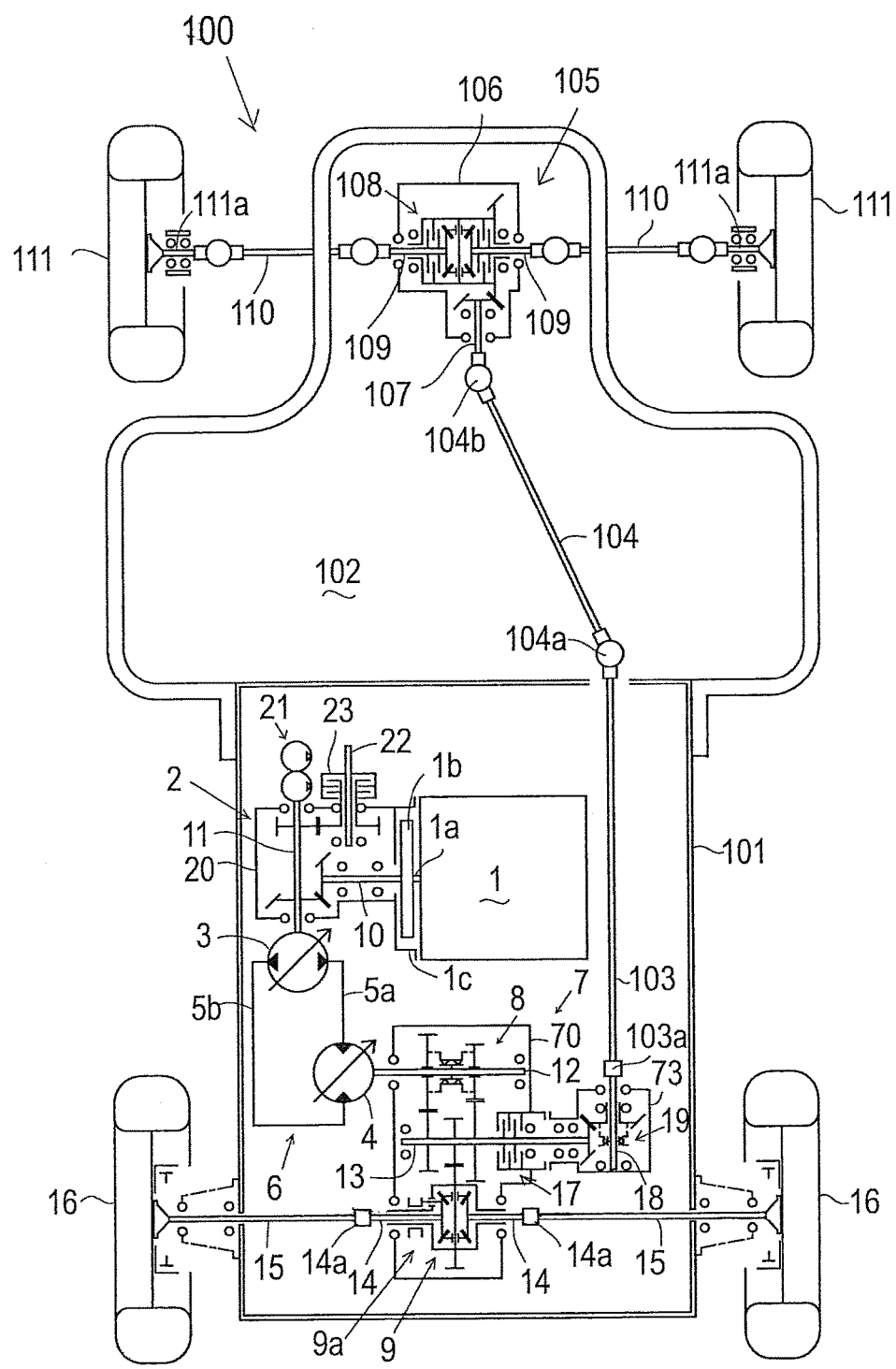
FIG. 1 is a schematic plan skeleton view of a power train of a vehicle 100.

Referring to FIG. 1, a vehicle 1 equipped with a transaxle according to the invention will be described. Vehicle 100 according to the present embodiment is a truck called "a utility vehicle". Vehicle 100 includes a vehicle body, i.e., a chassis, constituted by a rear frame 101 and a front frame 102 joined to each other. Rear frame 101 is provided thereon with a cargo bed (not shown). Front frame 102 is provided thereon with a driver's seat and various operation devices and instruments (not shown).

Rear frame 101 supports an engine 1, a transmission gear apparatus 2 and a rear transaxle 7. Engine 1 and transmission gear apparatus 2 continue laterally of vehicle 100. Rear transaxle 7 is disposed rearward from engine 1 and transmission gear apparatus 2.

Engine 1 is a horizontal engine that includes an output shaft 1a having an axis oriented laterally of vehicle 100. Transmission gear apparatus 2 includes a gear casing 20. A tandem hydraulic pump set 21 and a PTO shaft 22 provide with a clutch 23 are disposed at a front portion of transmission gear apparatus 2. A hydraulic pump 3 is attached to a rear portion of transmission gear apparatus 2. A transmission gear mechanism is disposed in gear casing 20 so as to transmit power from output shaft 1a of engine 1 to hydraulic pump 3, tandem hydraulic pump set 21, and PTO shaft 22 provided with clutch 23.

Rear transaxle 7 includes a rear transaxle casing 70. A hydraulic motor 4 is attached onto a right or left (in this embodiment, left) side portion of rear transaxle casing 70. Hydraulic pump 3 provided on transmission gear apparatus 2 is fluidly connected to hydraulic motor 4 provided on rear transaxle 7 via fluid pipes or the like serving as main fluid passages 5a and 5b, so that hydraulic pump 3, hydraulic motor 4 and main fluid passages 5a and 5b constitute a hydrostatic transmission (hereinafter referred to as "HST") 6 serving as a main traveling speed shift transmission for vehicle 100. Rear transaxle 7 includes a high-and-low speed gear transmission 8 serving as an auxiliary traveling speed shift transmission for vehicle 100. Gear transmission 8, including a transmission input shaft 12 and a transmission output shaft 13, is disposed in rear transaxle casing 70.

Rear transaxle 7 includes a differential unit 9 in rear transaxle casing 70. Differential unit 9 differentially connects right and left differential output shafts 14 to each other. Right and left differential output shafts 14 are formed at distal end portions thereof with respective coupled end portions 14a that project rightwardly and leftwardly outward from rear transaxle casing 70. Each of right and left propeller shafts 15 is connected at one end thereof to coupled end portion 14a of each differential output shaft 14 via a universal joint 15a. Right and left rear wheels 16 are disposed outside of right and left ends of rear frame 101. Each propeller shaft 15 is connected at the other end thereof to an axle 16a of each rear wheel 16 via a universal joint 15b. Accordingly, the power of engine 1 is transmitted to right and left rear wheels 16 via transmission gear apparatus 2, HST 6, and gear transmission 8 and differential unit 9 in rear transaxle 7.

Front frame 102 supports a front transaxle 105 including a front transaxle casing 106, an input shaft 107 and a differential unit 108. Input shaft 107 is journalled in rear transaxle casing 106 and projects rearward from front transaxle casing 106. Differential unit 108 is disposed in front transaxle casing 106. Differential unit 108 differentially connects right and left differential output shafts 109 to each other. Right and left differential output shafts 109 have respective distal ends projecting rightwardly and leftwardly outward from front transaxle casing 106. Right and left front wheels 111 are disposed outside of right and left ends of front frame 102. Each of right and left propeller shafts 110 connects each differential output shaft 109 to an axle 111a of each front wheel 111 via universal joints at both ends of each propeller shaft 110.

A PTO casing 73 is joined to another right or left side portion laterally opposite hydraulic motor 4 (in this embodiment, a right side portion) of rear transaxle casing 70 of rear transaxle 7. A front wheel driving PTO shaft 18 projects forward from PTO casing 73. In this way, rear transaxle 7 is configured so as to distribute a rotary power of transmission output shaft 13 serving as an output power of gear transmission 8 between differential unit 9 for driving rear wheels 16 and front wheel driving PTO shaft 18.

The power from transmission output shaft 13 is transmitted to front wheel driving PTO shaft 18 via a drive mode selection clutch 19 in PTO casing 73. Vehicle 100 is selectively set in either a two wheel drive mode or a four wheel drive mode depending on whether clutch 19 is engaged or disengaged.

A parking brake 17 is provided on transmission output shaft 13 in rear transaxle casing 70. When parking brake 17 is operated for braking, parking brake 17 applies a braking force on transmission output shaft 13 so that the braking force is transmitted to right and left rear wheels 16 via differential unit 9, thereby braking rear wheels 16. Further, if drive mode selection clutch 19 is engaged, the braking force is also transmitted to right and left front wheels 111 via front wheel driving PTO shaft 18, thereby braking front wheels 111.

Propeller shafts 103 and 104 are interposed between front wheel driving PTO shaft 18 of rear transaxle 7 and input shaft 107 of front transaxle 105. Rear propeller shaft 103 is connected at a rear end thereof to a front end of front wheel driving PTO shaft 18 via a splined sleeve 103a. Rear propeller shaft 103 is extended on a lateral (in this embodiment, right) side of engine 1 when viewed in plan so that a front end of rear propeller shaft 103 projects forward from rear frame 101 into front frame 102. Front propeller shaft 104 connects the front end of rear propeller shaft 103 to a rear end of input shaft 107 of front transaxle 105 via universal joints 104a and 104b at rear and front ends thereof. Therefore, the rotary power of transmission output shaft 13 received by front wheel driving PTO shaft 18 is transmitted to right and left front wheels 111 via propeller shafts 103 and 104, input shaft 107, differential unit 108, right and left differential output shafts 109 and right and left propeller shafts 110.

Figure 2:
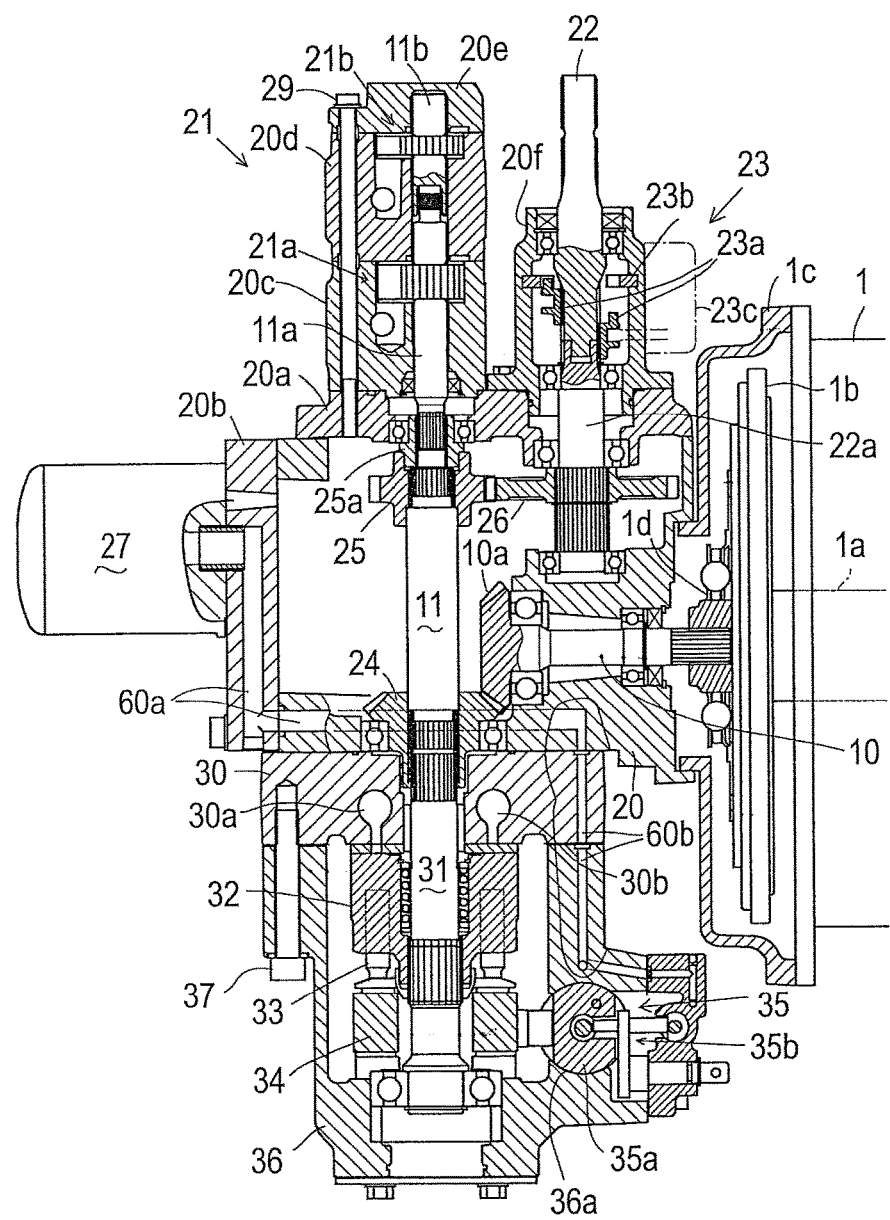
FIG. 2 is a sectional plan view of a transmission gear apparatus 2 have a hydraulic pump 3 attached thereto, which is provided continuously to an engine 1.

Referring to FIGS. 1 and 2, engine 1 and transmission gear apparatus 2 will be described in detail. A flywheel 1b is provided on an outer end of engine output shaft 1a of engine 1. Engine 1 is fixedly provided with a flywheel housing 1c incorporating flywheel 1b.

Transmission gear apparatus 2 is continuously extended laterally (in this embodiment, leftward) from engine 1 by joining a right or left (in this embodiment, right) end of gear casing 20 to flywheel housing 1c. Gear casing 20 has a front end opening. A front cover member 20a is fixed to a front end of gear casing 20 so as to cover the front end opening of gear casing 20. Tandem hydraulic pump set 21 and PTO shaft 22 provided with clutch 23 are extended forward from front cover member 20a so as to be juxtaposed rightward and leftward (in this embodiment, PTO shaft 22 provided with clutch 23 is disposed rightward from tandem hydraulic pump set 21). Hydraulic pump 3 for constituting HST 5 is fixed to a rear end surface of gear casing 20. Gear casing 20 also has a right or left (in this embodiment, left) side opening laterally opposite engine 1. A side cover member 20b including a fluid filter 27 is fixed to a right or left (in this embodiment, left) side portion of gear casing 20 so as to cover the side opening of gear casing 20.

A laterally extended input shaft 10 of transmission gear apparatus 2 is journalled by the right or left (in this embodiment, right) end portion of gear casing 20 facing engine 1 via a bearing. Input shaft 10 is extended coaxially to engine output shaft 1a and is connected at one axial end (in this embodiment, a right end) portion thereof to flywheel 1b in flywheel housing 1c via a damper 1d. In gear casing 20, input shaft 10 is formed on another axial end (in this embodiment, a left end) portion thereof with a bevel gear 10a. In gear casing 20, a transmission shaft 11 is extended in the fore-and-aft direction of vehicle 100, and a bevel gear 24 is spline-fitted on a rear end portion of transmission shaft 11, and meshes with bevel gear 10a. Bevel gear 24 is journalled by a rear end wall of gear casing 20 via a bearing.

In gear casing 20, a spur gear 25 is spline-fitted on a front end portion of transmission shaft 11. Spur gear 25 is connected at a front surface thereof to a connection boss member 25a that is journalled by front cover member 20a via a bearing. Tandem hydraulic pump set 21 attached to front cover member 20a includes a rear pump shaft 11a whose rear end portion is spline-fitted rearward into connection boss member 25a.

Tandem hydraulic pump set 21 disposed forward from transmission gear apparatus 2 includes a rear pump housing 20c, a front pump housing 20d and a front pump cover 20e. A rear end of rear pump housing 20c is attached to a front end of front cover member 20a. A rear end of front pump housing 20d is attached to a front end of rear pump housing 20c. Front pump cover 20e is attached to a front end of front pump housing 20d. Front cover member 20a, front and rear pump housings 20c and 20d and front pump cover 20e are fastened together by a bolt or bolts 29.

Rear pump shaft 11a is extended coaxially forward from transmission shaft 11, and is journalled in rear pump housing 20c. The rear end of rear pump shaft 11a is fixed into connection boss member 25a in gear casing 20 as mentioned above. Rear pump housing 20c incorporates a gear pump 21a. Rear pump shaft 11a serves as a drive shaft for ear pump 21a. A front portion of rear pump shaft 11a is extended further forward into front pump housing 20d and is journalled in front pump housing 20d. A front pump shaft 11b is extended coaxially forward from rear pump shaft 11a and is journalled in front pump housing 20d and front pump cover 20e. In rear pump housing 20d, a front end portion of rear pump shaft 11a is spline-fitted into a rear end portion of front pump shaft 11b. Front pump housing 20d incorporates a gear pump 21b. Front pump shaft 11b serves as a drive shaft for gear pump 21b.

Figure 12:
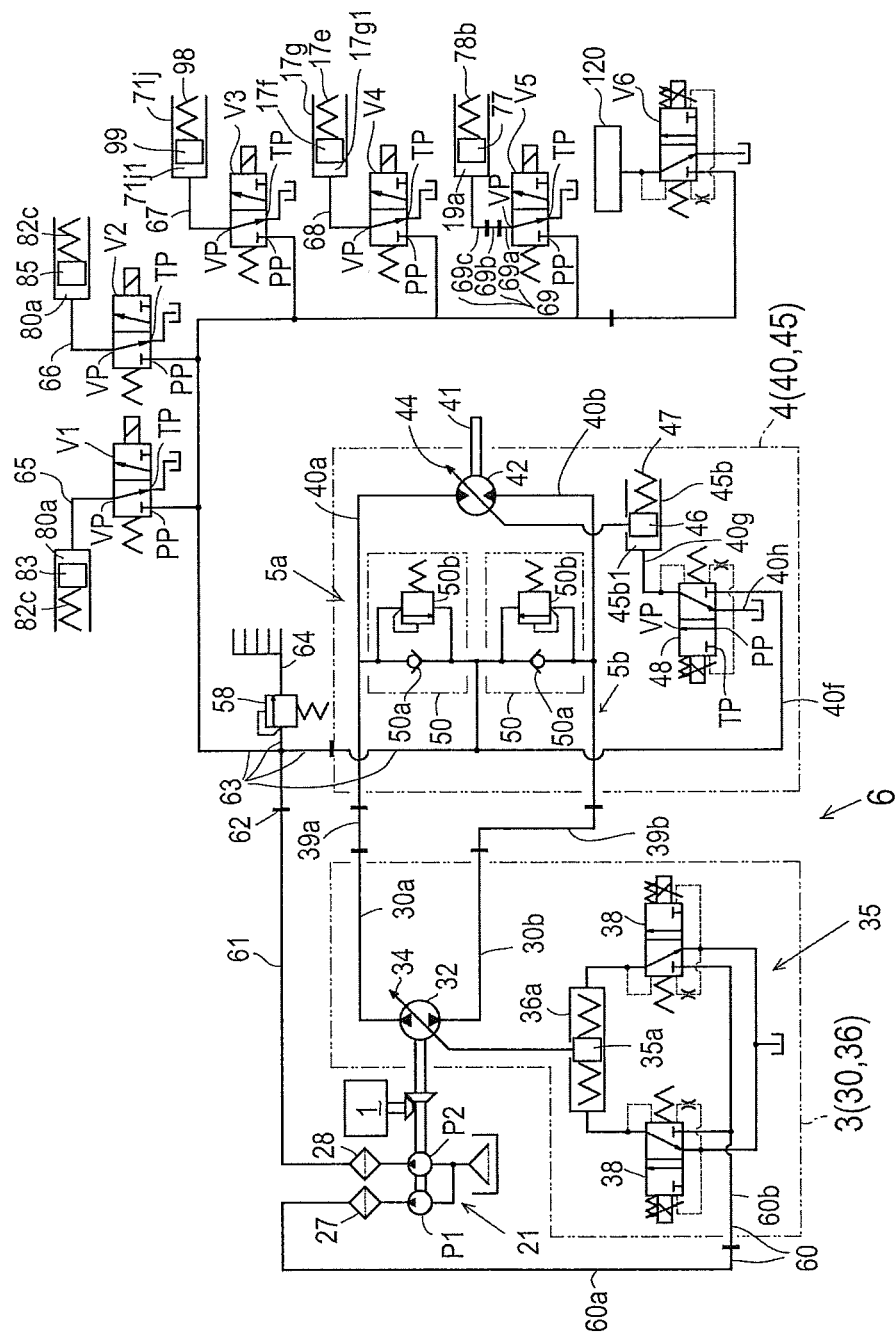
FIG. 12 is a hydraulic circuit diagram of vehicle 100.

In this way, tandem hydraulic pump set 21 includes front and rear gear pumps 21a and 21b. One of gear pumps 21a and 21b delivers fluid to a hydraulic servomechanism 35 for controlling a movable swash plate 34. The other of gear pumps 21a and 21b delivers fluid to be charged to a closed fluid circuit of HST 6 including main fluid passages 5a and 5b. In this regard, a hydraulic circuit diagram of FIG. 12 illustrates tandem hydraulic pump set 21 as including pumps P1 and P2. Pump P1 is illustrated as delivering hydraulic fluid to hydraulic servomechanism 35. Pump P2 is illustrated as delivering hydraulic fluid to the closed fluid circuit of HST 6, a later-discussed directional control valve 48, an actuator hydraulically controlled by directional control valve 48 to control a tilt of movable swash plate 44 of hydraulic motor 4, directional control valves V1 to V6 in rear transaxle 7, and hydraulic actuators controlled by respective directional control valves V1 to V6. Either gear pump 21a or 21b shown in FIG. 2 serves as each of pumps P1 and P2.

PTO shaft 22 directed forward of vehicle 100 is parallel to transmission shaft 11. PTO shaft 22 is drivingly connected to a PTO clutch shaft 22a extended coaxially rearward from PTO shaft 22 via PTO clutch 23. PTO clutch shaft 22a is journalled at an axial intermediate portion thereof by front cover member 20a via a bearing. PTO shaft 22 is extended in gear casing 20 rearward from front cover member 20a so as to be journalled via a bearing by the right or left (in this embodiment, right) side portion of gear casing 20 journaling input shaft 10. A spur gear 26 is fixed on PTO clutch shaft 22a in gear casing 20 immediately rearward from front cover member 20a, and meshes with spur gear 25.

A rear end portion of PTO clutch housing 20f is fixed to the front end surface of front cover member 20a. A front end portion of PTO clutch housing 20f journals an axial intermediate portion of PTO shaft 22 via a bearing. A rear end portion of PTO shaft 22 is fitted into a front end portion of PTO clutch shaft 22a rotatably relative to PTO clutch shaft 22a. PTO clutch 23 includes a clutch slider 23a and an annular stopper 23b. Clutch slider 23a is spline-fitted on an outer circumferential surface of PTO shaft 22. Annular stopper 23b is fixed to an inner circumferential surface of clutch housing 20f forward from clutch slider 23a. A front end portion of clutch slider 23a and an inner circumferential edge of stopper 23b are formed with respective clutch teeth that can engage mutually.

Clutch slider 23a is slidable in the fore-and-aft direction along PTO shaft 22. Clutch slider 23a is slid rearward to be set at a clutch-on position where clutch slider 23a is spline-fitted on both the rear portion of PTO shaft 22 and the front end portion of PTO clutch shaft 22a. Clutch slider 23a is slid forward to be set at a clutch-off position where clutch slider 23a is separated from PTO clutch shaft 22a and is spline-fitted on only PTO shaft 22. Further, the clutch teeth on the front end portion of clutch slider 23a set at the clutch-off position engage with the clutch teeth on the inner circumferential edge of stopper 23b, thereby quickly stopping PTO shaft 22 that tends to rotate inertially after PTO clutch 23 is disengaged. Incidentally, in FIG. 2, for convenience in illustration, clutch slider 23a is illustrated on the right side of PTO shaft 22 and PTO clutch shaft 22a as being set at the clutch-on position, and is illustrated on the left side of PTO shaft 22 and PTO clutch shaft 22a as being set at the clutch-off position.

Clutch housing 20f is externally provided with an electronic controlled actuator 23c Clutch slider 23a is connected to actuator 23c. Vehicle 100 is provided with a PTO clutch operation device (not shown) such as a switch. According to operation of the PTO operation device, a controller (not shown) controls actuator 23c so as to set clutch slider 23a at either the clutch-on position or the clutch-off position.

Actuator 23c may be assembled together with an electric motor serving as a drive source of actuator 23c. Alternatively, actuator 23c may be assembled together with a solenoid valve controlled by the controller and a hydraulic cylinder supplied with hydraulic fluid via the solenoid valve. If actuator 23c is the latter, either gear pump 21a or 21b may supply hydraulic fluid to the solenoid valve.

Referring to FIGS. 2 and 12, hydraulic pump 3 attached to transmission gear apparatus 2 will be described. Hydraulic pump 3 includes a pump port block 30, a pump shaft 31, a cylinder block 32, plungers 33, movable swash plate 34, hydraulic servomechanism 35, and a pump housing 36. Pump shaft 31 is extended coaxially rearward from transmission shaft 11. Pump shaft 31 is journalled at a front portion thereof by pump port block 30, and is spline-fitted at a front end portion thereof into a rear end portion of bevel gear 24. In this way, transmission shaft 11 and pump shaft 31 extended coaxially to transmission shaft 11 are rotatably integrated with each other via bevel gear 24. In other words, bevel gear 24 couples transmission shaft 11 to pump shaft 31 unrotatably relative to pump shaft 31.

Cylinder block 32 is rotatably slidably fitted onto a rear surface of pump port block 30, and is fixed on pump shaft 31. Pump housing 36 is fitted at a front end thereof to pump port block 30 and is fastened to pump port block 30 by a bolt or bolts 37. Pump housing 36 incorporates cylinder block 32. Movable swash plate 34 is supported between cylinder block 32 and a rear end portion of pump housing 36 so as to abut against heads (i.e., rear ends) of plungers 33 projecting rearward from cylinder block 32. Pump shaft 31 is extended rearward from cylinder block 32 and penetrates movable swash plate 34 so as to be journalled at a rear end thereof by the rear end portion of pump housing 36 via a bearing. A right or left side portion (in this embodiment, a right side portion facing engine 1) of pump housing 36 incorporates hydraulic servomechanism 35 for controlling the tilt of movable swash plate 34.

A structure of hydraulic servomechanism 35 of hydraulic pump 3 and a structure for supplying hydraulic fluid to hydraulic servomechanism 35 will now be described with reference to FIGS. 2 and 12.

Referring to FIG. 2, pump housing 36 is formed with a cylinder 36a in which a piston 35a of hydraulic servomechanism 35 serving as the actuator for tilting movable swash plate 34 is fitted slidably perpendicular to the axial line of hydraulic pump 3. A manipulation mechanism 35b for manipulation of a switching valve inside of piston 35a is attached to pump housing 36.

As understood from FIG. 12, cylinder 36a defines hydraulic fluid chambers therein on opposite sides of piston 35a in the slidable direction of piston 35a. Hydraulic pump 3 includes a pair of proportional solenoid valves serving as direction control valves 38. The pair of directional control valves 38 (not shown in FIG. 2) are attached to pump housing 36 or so on. Directional control valves 38 include respective inlet ports for receiving fluid delivered from pump P1 via a line filter 27, respective drain ports, and respective fluid supply and discharge ports fluidly connected to the respective hydraulic fluid chambers in cylinder 36a. Each directional control valve 38 is shiftable between a fluid supplying position and a fluid discharging position. Directional control valve 38 set at the fluid supply position closes the drain port, and fluidly connects the inlet port to the fluid supply and discharge port so as to supply fluid to the corresponding hydraulic fluid chamber. Directional control valve 38 set at the fluid discharging position closes the inlet port, and fluidly connects the drain port to the fluid supply and discharge port so as to drain fluid from the corresponding hydraulic fluid chamber. The control of directional control valve 38 in transfer thereof between the two positions is based on electric current amount applied to its solenoid so as to stroke piston 35a to a target position without rapid movement, thereby steplessly tilting movable swash plate 34 from its neutral position, and thereby continuously changing the displacement of hydraulic pump 3 or changing the delivery direction of hydraulic pump 3.

Referring to FIG. 12, a fluid passage 60 leading the fluid delivered from pump P1 to directional control valve 38 includes a fluid passage 60a at the upstream side of line filter 27 and a fluid passage 60b at the downstream side of line filter 27. Referring to FIG. 2, fluid passages 60a and 60b are formed in gear casing 20 and side cover member 20b of transmission gear apparatus 2. Further, fluid passage 60b is extended through pump port block 30 so as to reach the inside of pump housing 36.

Figure 3:
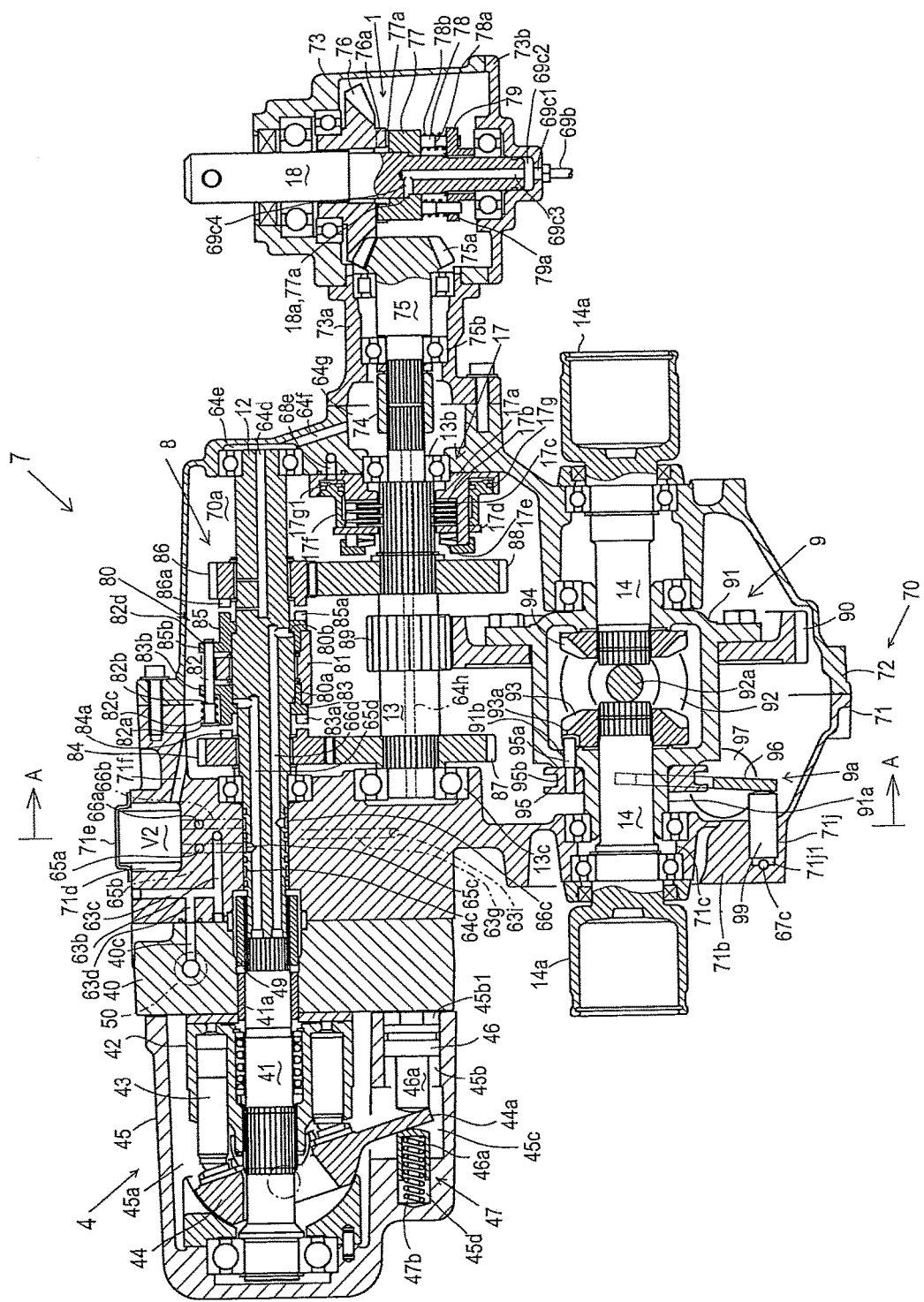
FIG. 3 is a sectional rear view of a rear transaxle 7 having a hydraulic motor 4 attached thereto.

Hydraulic motor 4 attached to rear transaxle 7 will be described in detail with reference to FIGS. 3, 4, 12 and others. Referring to FIG. 3, rear transaxle casing 70 of rear transaxle 7 includes a first divisional housing 71 at one right or left (in this embodiment, left) side thereof and a second divisional housing 72 at another right or left (in this embodiment, right) side thereof. First and second divisional housings 71 and 72 have respective vertical joint surfaces, which are extended in the fore-and-aft direction of vehicle 100 and are joined to each other so as to constitute rear transaxle casing 70. An inner space of rear transaxle casing 70 serves as a gear chamber 70a that incorporates gear transmission 8 and differential unit 9. First and second divisional housings 71 and 72 journal respective differential output shafts 14 extended rightward and leftward from differential unit 9 via respective bearings. Hydraulic motor 4 is attached to the right or left distal (in this embodiment, left) outside portion of first divisional housing 71 laterally opposite second divisional housing 72. On the other hand, as discussed later, PTO casing 73 journaling front wheel driving PTO shaft 18 is fixed via a PTO transmission shaft housing 73a to the right or left distal (in this embodiment, right) outside portion of second divisional housing 72 laterally opposite first divisional housing 71.

Figure 4:
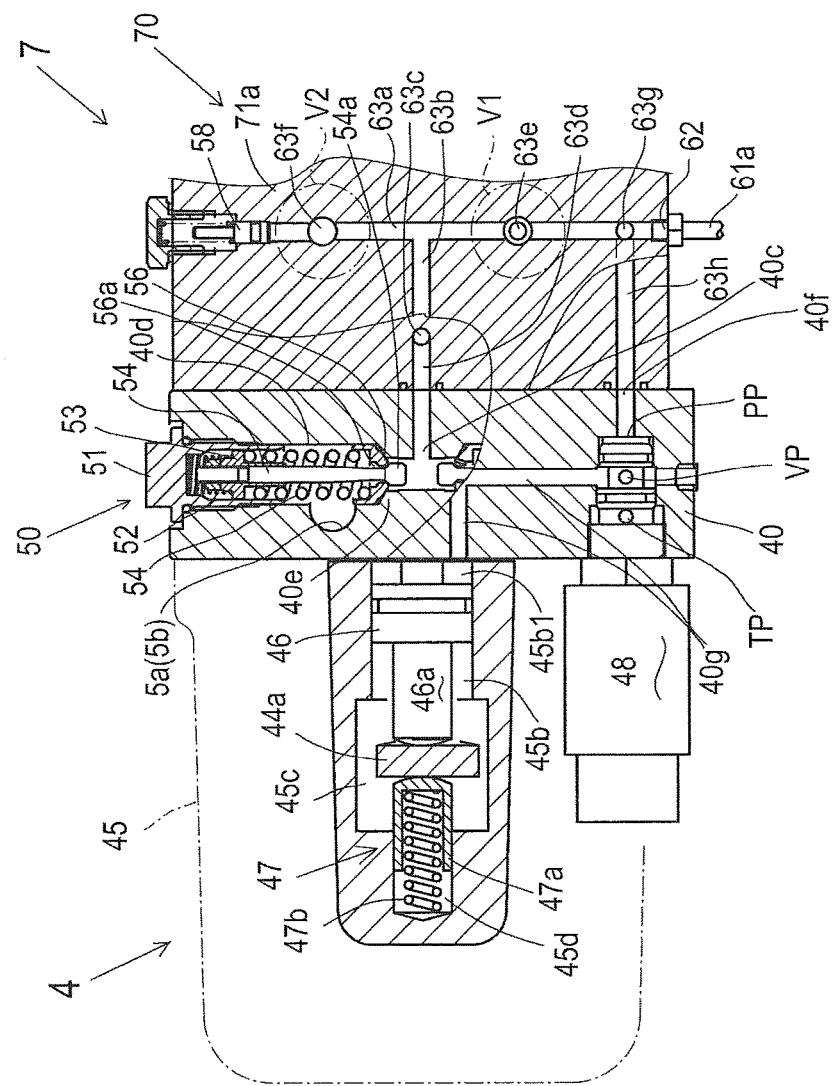
FIG. 4 is a sectional plan view of hydraulic motor 4 and a part of rear transaxle 7, showing a configuration of a hydraulic fluid passage in hydraulic motor 4 to a charge check relief valve 50, a movable swash plate controlling actuator and a directional control valve 48 for controlling the actuator.

Referring to FIGS. 3 and 4, hydraulic motor 4 includes a motor port block 40, a motor shaft 41, a cylinder block 42, plungers 43, a movable swash plate 44, a motor housing 45, a piston 46, a biasing member 47 and a directional control valve 48. Motor port block 40 is fixed to first divisional housing 71 of rear transaxle casing 70. More specifically, motor port block 40 is fixed to a later-discussed upper manifold portion 71a formed at an upper portion of first divisional housing 71. Cylinder block 42 is rotatably slidably fitted onto a right or left distal (in this embodiment, left) side surface of motor port block 40. Plungers 43 are laterally reciprocally fitted into cylinder block 42. Movable swash plate 44 abuts against heads of plungers 43. Motor housing 45 is fixed to a right or left distal (in this embodiment, left) side end surface of motor port block 40.

Motor shaft 41 is extended laterally so as to have an axial end (in this embodiment, left end) portion journalled by motor housing 45 via a bearing. Motor shaft 41 penetrates movable swash plate 44 and a central portion of cylinder block 42 so as to have another axial end (in this embodiment, right end) portion journalled in motor port block 40 via a bush 41a. Motor shaft 41 engages with cylinder block 42 unrotatably relative to cylinder block 42.

Referring to FIGS. 3 and 4, motor housing 45 is formed therein with a cylinder 45b, an arm chamber 45c and a spring chamber 45d laterally continuing to one another. Cylinder 45b has an opening at one end (in this embodiment, right end) thereof in an outer surface of motor port block 42, and has an opening at another end (in this embodiment, left end) thereof facing arm chamber 45c. Spring chamber 45d is formed opposite cylinder 45b with respect to arm chamber 45c.

Movable swash plate 44 pivoted in motor chamber 45a is formed with an arm 44a extended into arm chamber 45c. Piston 46 is laterally slidably fitted in cylinder 45b. A space in cylinder 45b from piston 46 to motor port block 40 is defined as a hydraulic fluid chamber 45b1 for hydraulically thrusting piston 46. Piston 46 is formed with a thruster 46a extended into arm chamber 45c, so that a tip of thruster 46a is pressed against arm 44a in arm chamber 45c. Biasing member 47 is disposed in spring chamber 44d. Biasing member 47 includes a thruster 47a and a spring 47b. Thruster 47a is disposed laterally slidably along an inner circumferential surface of spring chamber 44d, and projects from spring chamber 47 so as to be pressed at a tip thereof against arm 44a in arm chamber 45c. Spring 47b is disposed in spring chamber 44d so as to bias thruster 47a toward arm 44a. Therefore, a hydraulic pressure in hydraulic fluid chamber 45b1 is opposite a biasing force of sprig 47b so that thrusters 46a and 47a nip arm 44a of movable swash plate 44 therebetween. When hydraulic fluid is not supplied into hydraulic fluid camber 45b1, movable swash plate 44 is tilted at a low speed position to increase a displacement of hydraulic motor 4. When hydraulic fluid is supplied into hydraulic fluid camber 45b1, movable swash plate 44 is tilted at a high speed position to reduce the displacement of hydraulic motor 4.

Referring to FIG. 4, directional control valve 48 is provided in motor port block 40 so as to adjoin an outside of motor housing 45. In motor port block 40, directional control valve 48 is configured so as to include an inlet port PP, a valve port VP and a drain port TP. Motor port block 40 is formed therein with a fluid suction passage 40f, a bidirectional fluid flow passage 40g, and a fluid drain passage 40h (not shown in FIG. 4 but shown in FIG. 12). As discussed later, fluid suction passage 40f is configured so as to receive fluid from fluid passage 55 formed in first divisional housing 51 of gear casing 50, and so as to supply the fluid to inlet port PP of directional control valve 48. Bidirectional fluid flow passage 40g is interposed between valve port VP and hydraulic fluid chamber 41b1. Fluid drain passage 40h is extended from drain port TP. Preferably, the inside of motor chamber 45a is fluidly connected to the inside of rear transaxle casing 70 through motor port block 40 so that fluid flowing in fluid drain passage 40h can be joined to fluid in rear transaxle casing 70.

Referring to FIG. 12, a proportional solenoid valve serves as directional control valve 48 that is shiftable between a fluid supply position and a fluid discharge position. When directional control valve 48 is set at the fluid supply position, drain port TP is closed and inlet port PP is connected to valve port VP. When directional control valve 48 is set at the fluid discharge position, inlet port PP is closed and drain port TP is connected to valve port VP. The movement of directional control valve 48 during the transfer between the fluid supply position and the fluid discharge position corresponds to the amount of electric current applied to the solenoid of directional control valve 48, thereby steplessly changing a tilt angle of movable swash plate 44 between a high speed position and a low speed position. Therefore, the speed shift depending on tilting of movable swash plate 44 of hydraulic motor 4 is enabled during travel of vehicle 100. For example, if vehicle 100 with movable swash plate 44 set at the high speed position gets stuck in a muddy place, movable swash plate 44 can be shifted to the low speed position so as to enable vehicle 100 to escape from the muddy place, thereby preventing engine 1 from stalling. (Incidentally, on the contrary, a later-discussed shifter 80 of gear transmission 8 is desired to be shifted while vehicle 100 is stationary.)

Directional control valve 48 controlled to gradually move movable swash plate 44 to the low speed position so as to gradually increase the output torque of hydraulic motor 4 is automatically switched to return movable swash plate 44 to the high speed position once vehicle 100 escapes from the muddy place.

The hydraulic circuit structure of HST 6 will be described with reference to FIG. 12. Cylinder block 32 of hydraulic pump 3 is formed therein with cylinder bores into which respective plungers 33 are fitted, and pump port block 30 of hydraulic pump 3 attached to transmission gear apparatus 2 is formed therein with a pair of fluid passages 30a and 30b fluidly connected to the cylinder bores in cylinder block 32. On the other hand, cylinder block 42 of hydraulic motor 4 is formed therein with cylinder bores into which respective plungers 43 are fitted, and pump port block 40 of hydraulic motor 4 attached to rear transaxle 7 is formed therein with a pair of fluid passages 40a and 40b fluidly connected to the cylinder bores in cylinder block 42. A pair of fluid pipes 39a and 39b are interposed between pump port block 30 and motor port block 40, so that fluid passages 30a and 40a and fluid pipe 39a constitute main fluid passage 5a, and fluid passages 30b and 40b and fluid pipe 39b constitute main fluid passage 5b, thereby entirely constituting the closed fluid circuit of HST 6 in which hydraulic fluid is circulated.

HST 6 is provided with a pair of charge check and relief valves 50 each of which has both a function of charge check valve 50a and a function of relief valve 50b. Charge check and relief valves 50 are fluidly connected to respective main fluid passages 5a and 5b. In motor port block 40, each charge check and relief valve 50 is interposed between a charge fluid passage 40c and each of fluid passages 40a and 40b. Incidentally, FIG. 4 illustrates an entire structure of representative charge check and relief valve 50 interposed between charge fluid passage 40c and fluid passage 40a.

Charge check and relief valve 50 ordinarily includes a valve member 56 that is seated on a valve seat 40d when hydraulic fluid 40a or 40b is high-pressurized so that a hydraulic pressure in a corresponding valve chamber 40d plus a biasing force of a charge check spring 55 exceeds a hydraulic pressure in charge fluid passage 40c. The state where valve member 56 is seated on valve seat 40d corresponds to a closed state of charge check valve 50a in charge check and relief valve 50. On the other hand, a head 54a of a piston rod 54 projecting into charge fluid passage 40c closes a port 56a when a force of fluid pressure in the higher-pressurized valve chamber 40d is lower than the biasing force of a relief spring 52. The state where head 54a of piston rod 54 closes port 56a corresponds to a closed state of relief valve 50b in charge check and relief valve 50.

When fluid passage 40a or 40b (in FIG. 4, fluid passage 40a) connected to valve chamber 40d is hydraulically depressed so as to reduce the hydraulic pressure in valve chamber 40d so as to make the hydraulic pressure in charge fluid passage 40c exceed the reduced hydraulic pressure in valve chamber 40d plus the biasing force of charge check spring 55, valve member 56 moves away from valve seat 40e so that port 56a becomes open to charge fluid passage 40c, whereby fluid flows from the higher-pressurized charge fluid passage 40c to lower-pressurized valve chamber 40d so as to be supplied to hydraulically depressed fluid passage 40a or 40b. This state corresponds to an open state of charge check valve 50s (see FIG. 12). On the other hand, when fluid passage 40a or 40b is high-pressurized to make the hydraulic pressure in valve chamber 40d exceed a relief pressure defined by the biasing force of relief spring 52, the hydraulic pressure in valve chamber 40d thrusts head 54a of piston rod 54 to charge fluid passage 40c so that port 56a becomes open so as to allow fluid to flow from higher-pressurized valve chamber 40d to lower-pressurized charge fluid passage 40c. This is an open state of relief valve 50b (see FIG. 12). In this way, relief valve 50b keeps a regular value of hydraulic pressure in fluid passage 40a or 40b.

Referring to FIG. 12, fluid delivered from pump P2 is supplied to an inlet port 62 of a fluid passage 63 formed in rear transaxle casing 70 of rear transaxle 7 via a line filter 28 and a fluid passage 61. In rear transaxle casing 70, fluid passage 63 is bifurcated between a fluid passage to charge check and relief valves 50 and directional control valve 48 in HST 6 and another fluid passage to directional control valves V1 to V6 in rear transaxle 7 for controlling respective hydraulic actuators. A common relief valve 58 is connected to fluid passage 63 so as to keep the hydraulic pressure in fluid passage 63 corresponding to total hydraulic power for driving later-discussed respective hydraulic devices. A fluid drain passage extended from relief valve 58 serves as a lubricating fluid passage 64 such as to supply the fluid released from relief valve 58 as lubricating fluid to various lubricated parts in rear transaxle 7.

Figure 5:
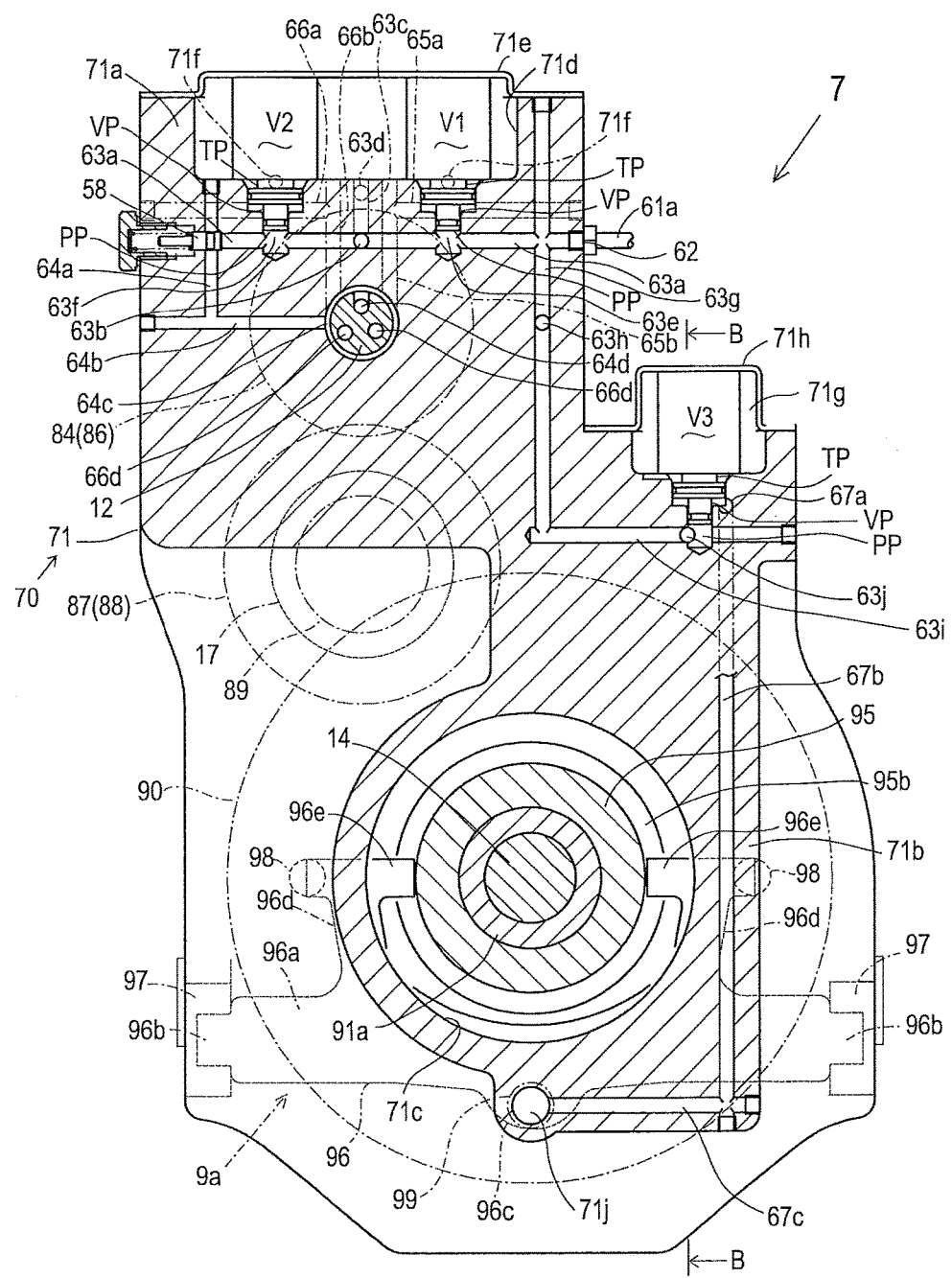
FIG. 5 is a sectional side view of rear transaxle 7 taken along arrowed A-A line of FIG. 3.

Fluid passage 61 for delivering fluid from pump P2 as shown in FIG. 12 includes a fluid passage part (not shown in FIG. 2) formed in gear casing 20 (including front cover member 20a, side cover member 20b and pump housings 20c and 20d) of transmission gear apparatus 2, and includes a fluid pipe 61a as shown in FIGS. 4 and 5. Referring to FIG. 5, inlet port 62a is provided in first divisional housing 71 of rear transaxle casing 70 of rear transaxle 7.

In this regard, referring to FIGS. 3, 4 and 5, a distal side portion of first divisional housing 71 defined as a right or left side wall of gear chamber 70a (in this embodiment, the left side wall attached to hydraulic motor 4) includes a laterally extended thick upper portion serving as an upper manifold portion 71a, and includes a lower portion serving as a lower manifold portion 71b formed therein with a bearing hole 71c for journaling right or left (in this embodiment, left) differential output shaft 14. Motor port block 40 of hydraulic motor 4 is fixed to an outer side surface of the distal side portion of upper manifold portion 71a. Inlet port 62 is open at rear end surface of upper manifold portion 71a. Relief valve 58 is fitted into a front end portion of upper manifold portion 71a. A fore-and-aft extended linear fluid hole 63a serving as a part of fluid passage 63 is formed in upper manifold portion 71a so as to connect inlet port 62 to relief valve 58.

Upper manifold portion 71a is further formed therein with a lateral fluid hole 63b, a vertical fluid hole 63c, and a lateral fluid hole 63d. Fluid hole 63b is extended laterally from a fore-and-aft intermediate portion of fluid hole 63a. Fluid hole 63c is extended vertically upward from fluid hole 63c. Fluid hole 63d is extended laterally from fluid hole 63c and is connected to charge fluid passage 40c formed in motor port block 40. In this way, fluid passage 63 includes fluid holes 63a, 63b, 63c and 63d and charge fluid passage 40c, which serve as a hydraulic circuit section for supplying fluid to the closed fluid circuit of HST 6.

Upper manifold portion 71a is further formed therein with a vertical fluid hole 63g and a lateral fluid hole 63h. Fluid hole 63g is extended vertically downward from a portion of fluid hole 63a adjacent to inlet port 62. Fluid hole 63h is extended laterally from fluid hole 63g and is connected to fluid suction passage 40f formed in motor port block 40. In this way, fluid passage 63 includes fluid holes 63a, 63g and 63h and fluid suction passage 40c, which serve as a hydraulic circuit section for supplying fluid to directional control valve 48 for controlling the tilt of movable swash plate 44 of hydraulic motor 4.

A hydraulic circuit section of fluid passage 63 for supplying fluid to directional control valves V1 to V6 for controlling respective hydraulic actuators and hydraulic circuits between respective directional control valves V1 to V6 and the respective hydraulic actuators will be described later in the following description of rear transaxle 7.

Rear transaxle 7 will be described with reference to FIGS. 3 to 12. In this regard, while FIG. 3 is a sectional rear view of rear transaxle 7, front wheel driving PTO shaft 18 is illustrated as extending vertically for convenience in illustration. Actually, as mentioned above, front wheel driving PTO shaft 18 is extended forward (may be vertically slant) to be connected to input shaft 106 of front transaxle 105 via propeller shafts 103 and 104.

Referring to FIG. 5 and others, as mentioned above, the distal side portion of first divisional housing 71 defined as the right or left (in this embodiment, left) side wall of gear chamber 70*a* in rear transaxle casing 70 is formed at the upper portion thereof as upper manifold portion 70*a*, and at the lower portion thereof as lower manifold portion 71*b*. In other words, upper manifold portion 71*a* defines an upper portion of gear chamber 70*a* provided for constituting gear transmission 8. On the other hand, lower manifold portion 71*a* defines a lower portion of gear chamber 70*a* provided for constituting differential unit 9 provided with differential locking system 9*a*.

A structure of gear transmission 8 will be described with reference to FIGS. 3 and 5 to 8. As shown in FIG. 3, in the upper portion of gear chamber 70*a*, transmission input shaft 12 and transmission output shaft 13 are extended laterally and parallel to each other. One axial side (in this embodiment, left) portions of transmission input and output shafts 12 and 13 directed toward hydraulic motor 4 are journalled via respective bearings by upper manifold portion 71*a* of first divisional housing 71. The other axial side (in this embodiment, right) portions of transmission input and output shafts 12 and 13 directed toward PTO casing 73 are journalled via respective bearings by a distal side portion of second divisional housing 72 defined as a right or left (in this embodiment, right) side wall of gear chamber 70*a* laterally opposite upper manifold portion 71*a* of first divisional housing 71.

Transmission input shaft 12 is extended further from the axial (left) side portion thereof journalled by upper manifold portion 71*a* so as to penetrate upper manifold portion 71*a* of first divisional housing 71 and so as to have an axial (left) end portion in motor port block 40. A sleeve-shaped coupler 49 having a splined inner circumferential portion is disposed within motor port block 40 and first divisional housing 71 through mutually joined surfaces of motor port block 40 and upper manifold portion 71*a*. An axial (right) end portion of motor shaft 41 and the axial (left) end portion of transmission input shaft 12 are spline-fitted into coupler 49 in opposite axial directions so that motor shaft 41 and transmission input shaft 12 are rotatably integrated with each other (i.e., unrotatable relative to each other).

Referring to FIG. 3, a high speed drive gear 84 and a low speed drive gear 86 are fitted on transmission input shaft 12 rotatably relative to transmission input shaft 12. On the other hand, a high speed driven gear 87 and a low speed driven gears 88 are fixed on transmission output shaft 13 so as to mesh with respective drive gears 84 and 86. Gears 84 and 87 meshing with each other serve as a high speed gear train. Gears 86 and 88 meshing with each other serve as a low speed gear train.

Figure 7:
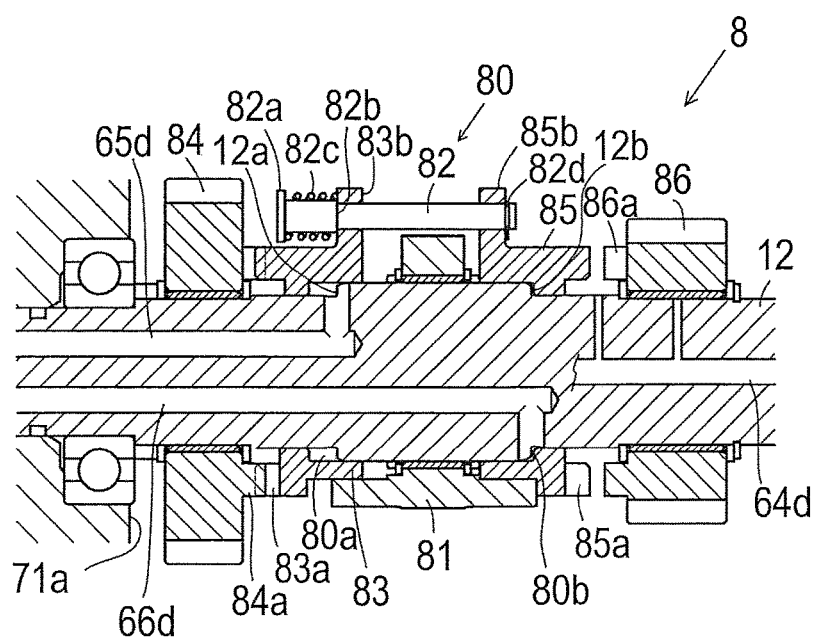
FIG. 7 is a sectional rear view of a shifter 80 in a gear transmission 8 set in a high speed stage.
Figure 8:
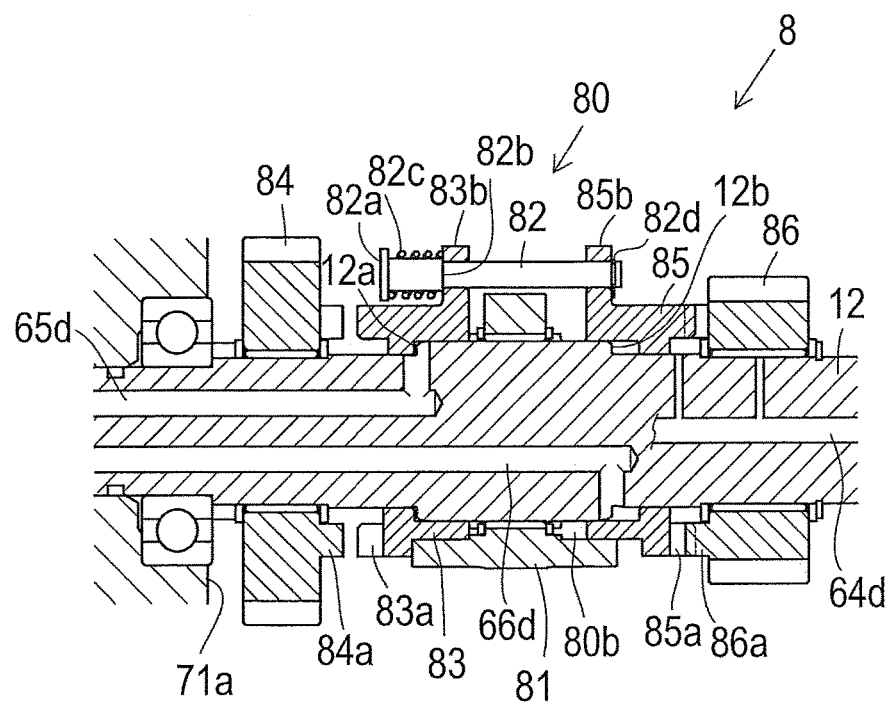
FIG. 8 is a sectional rear view of shifter 80 in gear transmission 8 set in a low speed stage.

Referring to FIGS. 3, 7 and 8, a shifter 80 is provided on transmission input shaft 12 between high speed drive gear 84 and low speed drive gear 86. Shifter 80 is an assembly including a common clutch hub 81, a guide pin 82, a high speed clutch slider 83, and a low speed clutch slider 85. Clutch hub 81 is fixed on transmission input shaft 12. High speed clutch slider 83 and low speed clutch slider 85 are disposed on right and left sides of clutch hub 81 and are fitted on transmission input shaft 12 laterally axially slidably along transmission input shaft 12 and unrotatably relative to transmission input shaft 12. High speed clutch slider 83 is disposed between one right or left (in this embodiment, left) end of clutch hub 81 and high speed drive gear 84. High speed clutch slider 83 is formed with clutch teeth 83*a* on an (left) end portion thereof facing high speed drive gear 84. High speed drive gear 84 is formed with clutch teeth 84*a* that faces clutch teeth 83*a* so as to be able to engage with clutch teeth 83*a*. On the other hand, low speed clutch slider 85 is disposed between another right or left (in this embodiment, right) end of clutch hub 81 and low speed drive gear 86. Low speed clutch slider 85 is formed with clutch teeth 85*a* on an (right) end portion thereof facing low speed drive gear 86. Low speed drive gear 86 is formed with clutch teeth 86*a* that faces clutch teeth 85*a* so as to be able to engage with clutch teeth 85*a*.

High speed clutch slider 83 is formed with at least one arm 83*b* extended radially from an outer circumferential surface thereof. Low speed clutch slider 85 is formed with at least one arm 85*b* that is extended radially from an outer circumferential surface thereof so that arm 83*b* and arm 85*b* having clutch hub 81 therebetween face each other. Preferably, high speed clutch slider 83 is formed with a plurality of arms 83*b* aligned along the circumference thereof, and low speed clutch slider 85 is formed with arms 85*b* as many as arms 83*b* so that arms 85*b* are aligned along the circumference of low speed clutch slider 85 so as to face respective arms 83*b*. However, the following description of shifter 80 is based on an assumption that shifter 80 is provided with single arm 83*b*, single arm 85*b* and single guide pin 82.

At least one guide pin 82 is extended parallel to transmission input shaft 12, and is interposed between arm 83*b* and arm 85*b*. Preferably, a plurality of guide pins 82 are provided to correspond to respective arms 83*b* and arms 85*b*. Guide pin 82 is passed through arm 83*b* and arm 85*b* so as to be axially slidable relative to each of arms 83*b* and 85*b*. An axial (in this embodiment, right) end portion of each guide pin 82 is extended toward low speed drive gear 86 from arm 85*b*, and is fixedly provided thereon with a retaining ring 82*d* that faces arm 85*b* so as to be able to contact arm 85*b*. Another axial (in this embodiment, left) end portion of each guide pin 82 is extended toward high speed drive gear 84 from arm 83*b* and is formed with a radial step 82*b* that faces arm 83*b* so as to be able to contact arm 83*b*. The axial (left) end portion of each guide pin 82 facing high speed drive gear 84 is extended further from step 82*b* toward high speed drive gear 84 so as to have a flanged tip whose outer diameter is larger than that of step 82*b*. The flanged tip of guide pin 82 serves as a spring retainer 82*a*. A spring 82*c* is interposed between spring retainer 82*a* of guide pin 82 and arm 83*b* of high speed clutch slider 83 and is wound around each guide pin 82. Therefore, spring 82*c* biases guide pin 82 toward high speed drive gear 84 in a direction to press retaining ring 82*d* against arm 85*d* of low speed clutch slider 85.

High speed clutch slider 83 is slidable axially along transmission input shaft 12 so as to be shifted between its clutch-on position where clutch teeth 83a engage with clutch teeth 84a of high speed drive gear 84 and its clutch-off position where clutch teeth 83a disengage from clutch teeth 84a. On the other hand, low speed clutch slider 85 is slidable axially along transmission input shaft 12 so as to be shifted between its clutch-on position where clutch teeth 85a engage with clutch teeth 86a of low speed drive gear 86 and its clutch-off position where clutch 85a disengage from clutch teeth 86a.

Referring to FIGS. 3, 7 and 8, transmission input shaft 12 is formed at an axially intermediate portion with a diametrically expanded portion having right and left stepped surfaces 12a and 12b. Clutch hub 81 is fixed on the diametrically expanded portion of transmission input shaft 12. High speed clutch slider 83 and stepped surface (in this embodiment, left stepped surface) 12a facing high speed clutch slider 83 define a hydraulic fluid chamber 80a therebetween for hydraulically thrusting high speed clutch slider 83 toward high speed drive gear 84. Low speed clutch slider 85 and stepped surface (in this embodiment, right stepped surface) 12b facing low speed clutch slider 85 define a hydraulic fluid chamber 80b therebetween for hydraulically thrusting low speed clutch slider 85 toward low speed drive gear 86.

In this regard, FIG. 3 illustrates shifter 80 set in a neutral state where both high speed clutch slider 83 and low speed clutch slider 85 are located at their respective clutch-off positions. When shifter 80 is set in the neutral state, spring 82c is free from hydraulic pressure in either hydraulic fluid chamber 80a or 80b so as to thrust arm 83b and spring retainer 82a in opposite directions, thereby causing a gap between step 82b of guide pin 82 and arm 83b, and thereby reducing a gap between arms 83b and 85b.

A structure for selectively supplying hydraulic fluid to either hydraulic fluid chamber 80a or 80b will be described. Referring to FIGS. 3 and 5, an upper surface of upper manifold portion 71a of first divisional housing 71 of rear transaxle casing 70 is formed with an upwardly open recess 71d. A high speed clutch directional control valve V1 and a low speed clutch directional control valve V2 are juxtaposed front and rear in recess 71d. A cover plate 71e is attached to a top portion of upper manifold portion 71a so as to cover the top opening of recess 71d.

Electromagnetic switching valves, each of which includes an inlet port PP, a drain port TP and a valve port VP, serve as respective directional control valves V1 and V2. Referring to FIG. 12, each of directional control valves V1 and V2 is shiftable between its fluid discharge position and its fluid supply position. Each directional control valve V1 or V2 is set at a fluid discharge position, where inlet port PP is closed and drain port TP is connected to valve port VP, when it is de-energized (i.e., its solenoid is unexcited). Each directional control valve V1 or V2 is set at a fluid supply position, where drain port TP is closed and inlet port PP is connected to valve port VP, when it energized (i.e., its solenoid is excited). Incidentally, each of later-discussed directional control valves V3, V4 and V5 is also an electromagnetic switching valve having the three ports PP, TP and VP and shiftable between the two positions, i.e., the fluid discharge position and the fluid supply position, so that each of directional control valves V3, V4 and V5 is selectively set at the fluid discharge position when it is de-energized, or is set at the fluid supply position when it is energized.

Directional control valves V1 and V2 include respective main valve bodies fitted into upper manifold portion 71a from a bottom surface of recess 71d, so as to have respective input ports PP at bottoms of the respective main valve portions. In upper manifold portion 71a, fluid holes 63e and 63f are branched upward from fluid hole 63a and are connected to respective inlet ports PP of directional control valves V1 and V2. Each of directional control valves V1 and V2 has valve port VP at a vertically intermediate portion of its main valve portion between inlet port PP and recess 71d. Each of directional control valves V1 and V2 has drain port TP open into recess 71d so that recess 71d serves as a drained fluid chamber. First divisional housing 71 is bored by a fluid drain hole 71f connecting recess 71d to gear chamber 70a. Therefore, fluid drained from drain port TP of each directional control valve V1 or V2 is dropped via recess 71d and fluid drain hole 71f into gear chamber 70a so as to lubricate various parts in gear chamber 70a and so as to return to a fluid sump in gear chamber 70a.

Referring to FIGS. 3 and 5, laterally aligned annular grooves 64c, 65c and 66c are formed on an outer circumferential surface of the portion of transmission input shaft 12 journalled in upper manifold portion 71a. Axial fluid holes 64d, 65d and 66d are formed in transmission input shaft 12 so as to be connected to respective annular grooves 64c, 65c and 66c via respective radial holes (not shown) formed in transmission input shaft 12.

Fluid hole 65d in transmission input shaft 12 fluidly connected to annular groove 65c via the radial hole is also fluidly connected to hydraulic fluid chamber 80a formed on the outer circumferential surface of transmission input shaft 12 via another radial hole. A fore-and-aft extended fluid hole 65a and a vertical fluid hole 65b are bored in upper manifold portion 71a. Valve port VP of high speed clutch directional control valve V1 is fluidly connected to annular groove 65c on transmission input shaft 12 via fluid holes 65a and 65b. In this way, fluid holes 65a and 65b formed in upper manifold portion 71a of first divisional housing 71 of rear transaxle casing 70, and annular groove 65c and fluid hole 65d formed in transmission input shaft 12 constitute a fluid passage 65 shown in FIG. 12, which fluidly connects valve port VP of high speed clutch directional control valve V1 to hydraulic fluid chamber 80a for activating high speed clutch slider 83 serving as an actuator for engaging and disengaging the high speed clutch including clutch teeth 83a and 84a. Therefore, high speed clutch slider 83 is selectively located at its clutch-off position by de-energizing high speed clutch directional control valve V1 to release fluid from hydraulic fluid chamber 80a, or is located at its clutch-on position by energizing high speed clutch directional control valve V1 to supply fluid to hydraulic fluid chamber 80a.

Fluid hole 66d in transmission input shaft 12 fluidly connected to annular groove 66c via the radial hole is also fluidly connected to hydraulic fluid chamber 80b formed on the outer circumferential surface of transmission input shaft 12 via another radial hole. A fore-and-aft extended fluid hole 66a and a vertical fluid hole 66b are bored in upper manifold portion 71a. Valve port VP of low speed clutch directional control valve V2 is fluidly connected to annular groove 66c on transmission input shaft 12 via fluid holes 66a and 66b. In this way, fluid holes 66a and 66b formed in upper manifold portion 71a of first divisional housing 71 of rear transaxle casing 70, and annular groove 66c and fluid hole 66d formed in transmission input shaft 12 constitute a fluid passage 66 shown in FIG. 12, which fluidly connects valve port VP of low speed clutch directional control valve V2 to hydraulic fluid chamber 80b for activating low speed clutch slider 85 serving as an actuator for engaging and disengaging the low speed clutch including clutch teeth 85a and 86a. Therefore, low speed clutch slider 85 is selectively located at its clutch-off position by non-energizing low speed clutch directional control valve V2 to release fluid from hydraulic fluid chamber 80b, or is located at its clutch-on position by energizing high speed clutch directional control valve V1 to supply fluid to hydraulic fluid chamber 80b.

When neither high speed clutch directional control valve V1 nor low speed clutch directional control valve V2 is energized, shifter 80 is set in the neutral state shown in FIG. 3, where both clutch sliders 83 and 85 are located at the respective clutch-off positions. In this state, the biasing force of spring 82c applied to guide pin 82 functions to reduce the gap between arms 83b and 85b so that clutch sliders 83 and 85 are pressed against respective stepped surfaces 12a and 12b of transmission input shaft 12 defining respective hydraulic fluid chambers 80a and 80b so as to locate clutch sliders 83 and 85 at the respective clutch-off positions.

If shifter 80 set in the neutral state has to be shifted to a high speed stage such as shown in FIG. 7, where high speed clutch slider 83 is set at the clutch-on position and low speed clutch slider 85 is set at the clutch-off position, high speed clutch directional control valve V1 is energized to supply hydraulic fluid to hydraulic fluid chamber 80a via fluid passage 65 while low speed clutch directional control valve V2 is de-energized. Accordingly, the hydraulic pressure in hydraulic fluid chamber 80a makes high speed clutch slider 83 slide to high speed drive gear 84. During the slide of high speed clutch slider 83, arm 83b moves to compress spring 82c. The compression of spring 82c presses retaining ring 82d against arm 85b so as to retain arm 85b at its clutch-off position, and so as to retain guide pin 82 by arm 85b contacting retaining ring 82d. Therefore, as arm 83b moves to compress spring 82c, the gap between arm 83b and step 82b of guide pin 82 is reduced. Finally, arm 83b comes to abut against step 82b of guide pin 82, thereby finishing the slide of high speed clutch slider 83, i.e., completing location of high speed clutch slider 83 at the clutch-on position.

If shifter 80 set in the neutral state has to be shifted to a low speed stage such as shown in FIG. 8, where low speed clutch slider 85 is set at the clutch-on position and high speed clutch slider 83 is set at the clutch-off position, low speed clutch directional control valve V2 is energized to supply hydraulic fluid to hydraulic fluid chamber 80b via fluid passage 66 while high speed clutch directional control valve V1 is de-energized. Accordingly, the hydraulic pressure in hydraulic fluid chamber 80b makes low speed clutch slider 85 slide to low speed drive gear 86. During the slide of low speed clutch slider 85, arm 85b thrusts retaining ring 82d so as to move guide pin 82 to reduce the gap between step 82b of guide pin 82 and arm 83b of high speed clutch slider 83, thereby compressing spring 82c. Compressed spring 82c is pressed against arm 83b to retain high speed clutch slider 83 at its clutch-off position. Finally, step 82b of guide pin 82 comes to abut against arm 83b of high speed clutch slider 83 so as to stop guide pin 82, thereby finishing the slide of low speed clutch slider 85, i.e., completing location of low speed clutch slider 85 at the clutch-on position.

Therefore, when shifter 80 is set in the high speed stage, gear transmission 8 serving as the auxiliary speed shift transmission for vehicle 100 transmits the rotary power of transmission input shaft 12 driven by hydraulic motor 4 of HST 6 to transmission output shaft 13 via the high speed gear train including high speed drive gear 84 and high speed driven gear 87. When shifter 80 is set in the low speed stage, gear transmission 8 transmits the rotary power of transmission input shaft 12 driven by hydraulic motor 4 of HST 6 to transmission output shaft 13 via the low speed gear train including low speed drive gear 86 and low speed driven gear 88. When shifter 80 is set in the neutral state, both the high speed clutch and the low speed clutch are disengaged so as to isolate both high speed drive ear 84 and low speed drive gear 86 from the rotary power of transmission input shaft 12, thereby preventing transmission output shaft 13 and rear wheels 16 at the downstream side of transmission output shaft 13 (and front wheels 111 receiving power from transmission output shaft 13 via front wheel driving PTO shaft 18) from being driven regardless of rotation of transmission input shaft 12 driven by HST 6.

In this regard, the conventional dog clutch type shifter includes a clutch slider having clutch teeth, which is slid by using a mechanical link system, such as a fork and a fork shaft. On the contrary, above-mentioned shifter 80 of gear transmission 8 in rear transaxle 7 of vehicle 100 includes clutch sliders 83 and 85 having clutch teeth 83a and 85a, which are slid by hydraulic fluid supplied to hydraulic fluid chamber 80a or 80b via fluid passages formed in a wall (i.e., upper manifold portion 71a of first divisional housing 71) of a transmission casing (i.e., rear transaxle casing 70) and transmission input shaft 12. Therefore, shifter 80 advantageously reduces its component parts in number and cost, and advantageously diminishes a space in the transmission casing (i.e., rear transaxle casing 70) for the mechanical link system, thereby minimizing rear transaxle 7, lightening an operational force for shifting shifter 80, and increasing a responsibility of shifter 80.

Further, the electromagnetic (solenoid) valves serving as directional control valves V1 and V2 are advantageously attached to first divisional housing 71 of rear transaxle casing 70, so that rear transaxle 7 needs neither additional assembly including directional control valves V1 and V2 and later-discussed directional control valves V3 to V5 nor pipes for supplying fluid from the respective directional control valves to respective hydraulic fluid chambers. Moreover, rear transaxle 7 is advantageous in biwiring vehicle 100 so that when rear transaxle 7 is equipped on vehicle 100, only the connecting of the electromagnetic valves serving as directional control valves V1 to V5 via wires to a controller (not shown) is needed to complete a control system including the directional control valves, thereby improving assembility of vehicle 100 and minimizing the power train system including rear transaxle 7 and entire vehicle 100.

Here, dog clutch-type shifter 80 has a fear of damaging the clutch teeth if a rotary speed difference between transmission input shaft 12 and target speed gear 84 or 86 during the transfer of shifter 80 to engage the high or low speed clutch is excessive. Therefore, vehicle 100 is provided with a checking system including a vehicle speed sensor (not shown) so that even if an auxiliary speed shift manipulator in vehicle 100 is manipulated to shift the speed stage, the unshown controller keeps the present state of shifter 80 unless the vehicle speed sensor detects vehicle 100 as being completely stationary. For example, a manner for keeping the present state of shifter 80 is to lock the auxiliary speed shift manipulator at the initially set speed stage position during the traveling of vehicle 100 from start of the traveling unless the vehicle speed sensor detects zero of the vehicle speed. Alternatively, the manner may be to keep the energized state of one directional control valve V1 or V2 and the de-energized state of the other directional control valve V1 or V2 regardless of manipulation of the auxiliary speed shift manipulator.

Conversely, it is conceivable that the auxiliary speed shift manipulator is unlocked so as to be able to be manipulated freely only when the vehicle speed sensor detects the zero vehicle speed, or that the alternate energizing and de-energizing of direction control valves V1 and V2 can be transferred only when the vehicle speed sensor detects the zero vehicle speed.

Incidentally, when an ignition switch (key switch) of vehicle 100 is turned off, neither directional control valve V1 nor V2 is energized, thereby setting shifter 80 in the neutral state. Therefore, when the ignition switch is turned on to start vehicle 100, the high or low speed clutch of shifter 80 having necessarily been set in the neutral state is engaged, thereby preventing vehicle 100 from starting suddenly.

Alternatively, to enable the speed shift with shifter 80 during travel of vehicle 100 as well as during the stationary state of vehicle 100, it is conceivable that the clutch engaging action of shifter 80 is allowed once it is recognized that the rotation of transmission input shaft 12 and the rotation of target speed drive gear 84 or 86 become synchronous to each other.

Here, when the auxiliary speed shift manipulator is manipulated, the set speed clutch having been engaged is disengaged (i.e., corresponding directional control valve V1 or V2 having been energized is de-energized) so as to set shifter 80 in the neutral state before the target speed clutch is engaged. If shifter 80 is set in the neutral state during travel of vehicle 100, the target speed drive gear 84 or 86 still rotates inertially. Therefore, during the neutral state of shifter 80, the rotary speed of target speed drive gear 84 or 86 is compared with the rotary speed of transmission input shaft 12, i.e., motor shaft 41. If there is a differential rotary speed between target speed drive gear 84 or 86 and transmission input shaft 12 or motor shaft 41, the tilt angle of movable swash plate 44 of hydraulic motor 4 is adjusted to reduce the differential rotary speed, i.e., to make the output speed of hydraulic motor 4, i.e., the rotary speed of motor shaft 41 and transmission input shaft 12 approach the rotary speed of target speed drive gear 84 or 86. Once the differential rotary speed is recognized as being diminished or coming into an allowable range, target speed clutch directional control valve V1 or V2 is energized to engage the target speed clutch.

Incidentally, movable swash plate 44 of hydraulic motor 4 is basically shifted between the two positions, i.e., the high speed position and the low speed position. In this regard, referring to FIG. 12, the tilt angle of movable swash plate 44 may be continuously adjustable between the high speed position and the low speed position based on the proportional action of the proportional solenoid valve serving as directional control valve 48 for controlling the slide of piston 46 serving as the actuator for tilting movable swash plate 44, thereby adjusting the rotary speed of motor shaft 41 to coincide to the rotary speed of target speed drive gear 84 or 86.

As mentioned above, gear transmission 8 includes transmission input shaft 12 serving as a transmission shaft, gears 84 and 86, and shifter 80 including clutch sliders 83 and 85. Each of gears 84 and 86 is provided on transmission input shaft 12 rotatably relative to transmission input shaft 12. Each of clutch sliders 83 and 85 is provided on transmission input shaft 12 axially slidably along transmission input shaft 12 and unrotatably relative to transmission input shaft 12. Each gear 84 or 86 and each clutch slider 83 or 85 are provided with respective clutch teeth 84a or 86a and 83a or 85a. Shifter 80 includes the high speed clutch and the low speed clutch each of which is set in either the clutch-on state where clutch teeth 84a or 86a of gear 84 or 86 engage with clutch teeth 83a or 85a of clutch slider 83 or 85 or the clutch-off state where clutch teeth 84a or 86a of gear 84 or 86 disengage from clutch teeth 83a or 85a of clutch slider 83 or 85. Shifter 80 is provided with the hydraulic control system such as the hydraulic circuit shown in FIG. 12 to hydraulically control the respective axial slide actions of each of clutch sliders 83 and 85 in the clutch-on direction for realizing the clutch-on state and in the clutch-off direction for realizing the clutch-off state.

High speed clutch slider 83 and low speed clutch slider 85 are disposed between high speed drive gear 84 and low speed drive gear 86. The hydraulic control system hydraulically controls the axial slide actions of high speed clutch slider 83 in the clutch-on and clutch-off directions and the axial slide actions of low speed clutch slider 85 in the clutch-on and clutch-off directions so as to realize either the high speed clutch-on state where clutch teeth 84a of high speed drive gear 84 engage with clutch teeth 83a of high speed clutch slider 83 or the low speed clutch-on state where clutch teeth 86a of low speed drive gear 86 engage with clutch teeth 85a of low speed clutch slider 85 in such a way that the high speed clutch-on state and the low speed clutch-on state are contradictory to each other.

Common guide pins 82 connect clutch sliders 83 and 85 to each other. Guide pins 82 are provided with springs 82c that bias clutch sliders 83 and 85 in the respective clutch-off directions. The hydraulic control system applies a hydraulic pressure to either high speed clutch slider 83 or low speed clutch slider 85 so that high or low speed clutch slider 83 or 85 receiving the hydraulic pressure slides in the clutch-on direction against the biasing force of springs 82c.

Guide pins 82 are provided with respective steps 82b which can abut against respective arms 83b of high speed clutch slider 83 so as to serve as a high speed clutch slider restriction that prevents high speed clutch slider 83 from sliding beyond a predetermined degree in the clutch-on direction of high speed clutch slider 83. Guide pins 82 are also provided with respective retaining rings 82d which can abut against respective arms 85b of low speed clutch slider 85 so as to serve as a low speed clutch slider restriction that prevents low speed clutch slider 85 from sliding beyond a predetermined degree in the clutch-on direction of low speed clutch slider 85.

When shifter 80 of gear transmission 8 equipped on vehicle 100 is set in either the high or low speed clutch-on state, the set high or low speed clutch-on state is kept unless vehicle 100 is recognized as stationary.

Alternatively, when shifter 80 of gear transmission 8 equipped on vehicle 100 is operated to be shifted between the high speed clutch-on state and the low speed clutch-on state during travel of vehicle 100, respective clutch teeth 84a or 86a of high or low speed drive gear 84 or 86 and high or low speed clutch slider 83 or 85 having engaged with each other before the shift operation of shifter 80 are disengaged from each other, and then, target high or low speed clutch slider 83 or 85 to have its clutch teeth 83a or 85a engaged after the shift operation of shifter 80 slides in its clutch-on direction once a rotary speed of transmission input shaft 12 becomes equal to a rotary speed of high or low speed drive gear 84 or 86 to have its clutch teeth 84a or 86a engaged with clutch teeth 83a or 85a of target high or low speed clutch slider 83 or 85.

A lubricating fluid passage system, including above-mentioned annular groove 64c and fluid hole 64d formed in transmission input shaft 12 to be connected to each other, which uses fluid drained from relief valve 58, will be described. Referring to FIGS. 3 and 5, in upper manifold portion 71a, a vertical fluid hole 64a is bored to extend downward from the bottom of recess 71*d* so as to cross fore-and-aft fluid hole 63*a*, and a fluid hole 64*b* is bored to extend in the fore-and-aft direction from a lower end of fluid hole 64*a* so as to be connected to annular groove 64*c* on transmission input shaft 12. Once the hydraulic pressure in fluid passage 63 regulated by relief valve 58 exceeds a predetermined relief pressure, relief valve 58 having occupied the junction of fluid holes 63*a* and 64*a* to separate fluid hole 64*a* from fluid hole 63*a* is thrust by the hydraulic pressure in fluid passage 63 so as to move away from the junction of fluid holes 63*a* and 64*a*, thereby fluidly connecting fluid hole 63*a* to fluid hole 64 so as to release a surplus pressurized fluid to fluid hole 64*a*.

In this way, fluid holes 64*a* and 64*b* in upper manifold portion 71*a* and annular groove 64*c* and fluid hole 64*d* in transmission input shaft 12 constitute a fluid passage 64 shown in FIG. 12, which serves as a lubricating fluid passage. In other words, fluid hole 64*d* in transmission input shaft 12 is used as a lubricating fluid passage from which radial holes are branched to lubricated parts on the outer circumferential surface of transmission input shaft 12, e.g., surfaces of mutually contacting gears 84 and 86 and transmission input shaft 12, clutch teeth 83*a* and 84*a* of the high speed clutch, and clutch teeth 85*a* and 86*a* of the low speed clutch. Fluid hole 64*d* also has an opening at the axial end portion of transmission input shaft 12 close to PTO casing 73, so that fluid from this opening is supplied as lubricating fluid to lubricated parts on transmission output shaft 13, e.g., the gears and the brake, as described in detail later.

A layout of fluid holes in upper manifold portion 71*a* constituting fluid passages 63, 64, 65 and 66 will be described in more detail. Referring to FIG. 3, annular grooves 65*c* and 66*c* on transmission input shaft 12 are offset leftward and rightward from a position just vertically downward from fluid hole 63*a*. In correspondence to the arrangement of annular grooves 65*c* and 66*c* relative to fluid hole 63*a*, vertical fluid holes 65*b* and 66*b* connected to respective fluid holes 65*c* and 66*c*, and fore-and-aft fluid holes 65*a* and 66*a* extended from respective valve ports VP of directional control valves V1 and V2 and connected to respective fluid holes 65*b* and 66*b* are also offset leftward and rightward from the position just vertically upward from fluid hole 63*a*. Therefore, vertical fluid holes 65*b* and 66*b* are prevented from interfering with fore-and-aft fluid holes 63*a*.

On the other hand, referring to FIG. 5, transmission input shaft 12 is disposed between directional control valves V1 and V2 in the fore-and-aft direction. In other words, directional control valves V1 and V2 are offset forward and rearward from transmission input shaft 12. In correspondence to the arrangement of transmission input shaft 12 relative to directional control valves V1 and V2, vertical fluid holes 65*b* and 66*b* are disposed between front and rear directional control valves V1 and V2. Fluid holes 63*b*, 63*c* and 63*d* branching from fluid hole 63*a* to extend to charge check and relief valves 50 in motor port block 40 of hydraulic motor 4 are disposed between vertical fluid holes 65*b* and 66*b* in the fore-and-aft direction. In this way, fluid holes 63*b*, 63*c* and 63*d* of fluid passage 63 for supplying hydraulic fluid to the closed fluid circuit of HST 6, and fluid holes 65*b* and 66*b* of respective fluid passages 65 and 66 extended to respective annular grooves 65*c* and 66*c* on transmission input shaft 12 are collected without hindering each other in upper manifold portion 71*a* between front and rear directional control valves V1 and V2, thereby restricting expansion of upper manifold portion 71*a* in the fore-and-aft direction.

Fluid passage 63 for supplying high-pressurized hydraulic fluid includes vertical fluid hole 63*g* for supplying the high-pressurized fluid to directional control valve 48 for controlling movable swash plate 44 of hydraulic motor 4. Fluid hole 63*g* crosses fluid hole 63*a* in upper manifold portion 71*a* closer to inlet port 62 than directional control valves V1 and V2 in the fore-and-aft direction. On the other hand, fluid passage 64 for supplying low-pressurized lubricating fluid includes vertical fluid hole 64*a* connected to recess 71*d* serving as the drained fluid chamber. Fluid hole 64*a* crosses fluid hole 63*a* in upper manifold portion 71*a* closer to relief valve 58 than directional control valves V1 and V2 in the fore-and-aft direction. In this way, fluid hole 63*g* for supplying the high-pressurized hydraulic fluid for controlling movable swash plate 44 and fluid hole 64*a* for supplying low-pressurized lubricating fluid are distributed forward and rearward so as to have directional control valves V1 and V2, fluid holes 65*a*, 65*b*, 66*a* and 66*b* extended from valve ports VP of respective directional control valves V1 and V2, and fluid holes 63*b*, 63*c* and 63*d* for charging fluid to the closed fluid circuit of HST 6 therebetween, thereby being prevented from interfering with these valves and fluid holes, and thereby being located appropriately to ensure the respective required pressures of fluid.

Differential unit 9 provided with differential locking system 9*a* configured in the lower portion of gear chamber 70*a* will be described with reference to FIGS. 3, 5, 6, 10 and 11. Ordinary bevel-gear type differential unit 9 includes a bull gear 90, a differential casing 91, at least one differential bevel pinion 92, and a pair of differential side bevel gears 93 and 94. A transmission output gear 89 is fixed (or formed) on transmission output shaft 13 between high speed driven gear 87 and low speed driven gear 88. Bull gear 90 is annularly fixed on differential casing 91 so as to serve as an input gear of differential unit 9, and directly meshes with transmission output shaft 89. One right or left (in this embodiment, left) differential output shaft 14 is passed through bearing hole 71*c* in first divisional housing 71 so as to be journalled by lower manifold portion 71*b*. The other right or left (in this embodiment, right) differential output shaft 14 is journalled by second divisional housing 72. Proximal end portions of right and left differential output shafts 14 are inserted into differential casing 71 so as to be disposed coaxially to each other. Coupled end portions 14*a* at the distal portions of respective differential output shafts 14 projecting rightward and leftward outward from respective first and second divisional housings 71 and 72 are cup-shaped so as to have respective recesses into which universal joints 15*a* of respective propeller shafts 15 are fitted.

In differential casing 91, differential side bevel gear 93 is fixed on the proximal end portion of differential output shaft 14 journalled by first divisional housing 71, and differential side bevel gear 94 is fixed on the proximal end portion of differential output shaft 14 journalled by second divisional housing 72. In differential casing 91, a differential bevel pinion shaft 92*a* is disposed between right and left differential side gears 93 and 94 so as to extend perpendicular to the axial direction of differential output shafts 14, so that differential side gears 93 and 94 mesh with differential bevel pinion 92 pivoted on differential bevel pinion shaft 92*a*.

Differential locking system 9*a* is an assembly including a differential locking slider 95, a differential locking fork 96, a bearing cap 97, a pair of springs 98, and a piston 99. Differential side gear 93 fixed on the proximal end portion of differential output shaft 14 journalled by first divisional housing 71 is formed with recesses 93*a* into which later-discussed differential locking pins 95*a* can be fitted. Recesses 93*a* are open at an end surface of differential side gear 93 facing an inside surface of a side wall of differential casing 91. Differential casing 91 is formed with pin holes 91*b* through the side wall thereof in correspondence to respective recesses 93*a*. The side wall of differential casing 91 is formed with a boss 91*a* fitted on an outer circumferential surface of differential output shaft 14. Differential locking slider 95 is axially (laterally) slidably fitted on boss 91*a* of differential casing 91. Differential locking slider 95 is slidably shiftable between a differential locking position as shown in FIG. 3, where differential locking slider 95 approaches differential casing 91, and a differential unlocking position not shown in FIG. 3, where differential locking slider 95 approaches lower manifold portion 71*b* opposite differential casing 91.

Differential locking pins 95*a* are extended laterally from differential locking slider 95 and are inserted into respective pin holes 91*b* constantly regardless of the slide of differential locking slider 95 (whether differential locking slider 95 is located at the differential locking position or the differential unlocking position). When differential locking slider 95 is located at the differential locking position as shown in FIG. 3, tips of differential locking pins 95*a* are fitted into respective recesses 93*a* of differential side gear 93 in differential casing 91 so as to lock differential side gear 93 to differential casing 91, thereby preventing right and left differential output shafts 14 from rotating differentially. On the other hand, when differential locking slider 95 is located at the unshown differential unlocking position, the tips of differential locking pins 95*a* are withdrawn from respective recesses 93*a* of differential side gear 93 so as to separate differential side gear 93 from differential casing 91, thereby allowing right and left differential output shafts 14 to rotate differentially.

Figure 9:
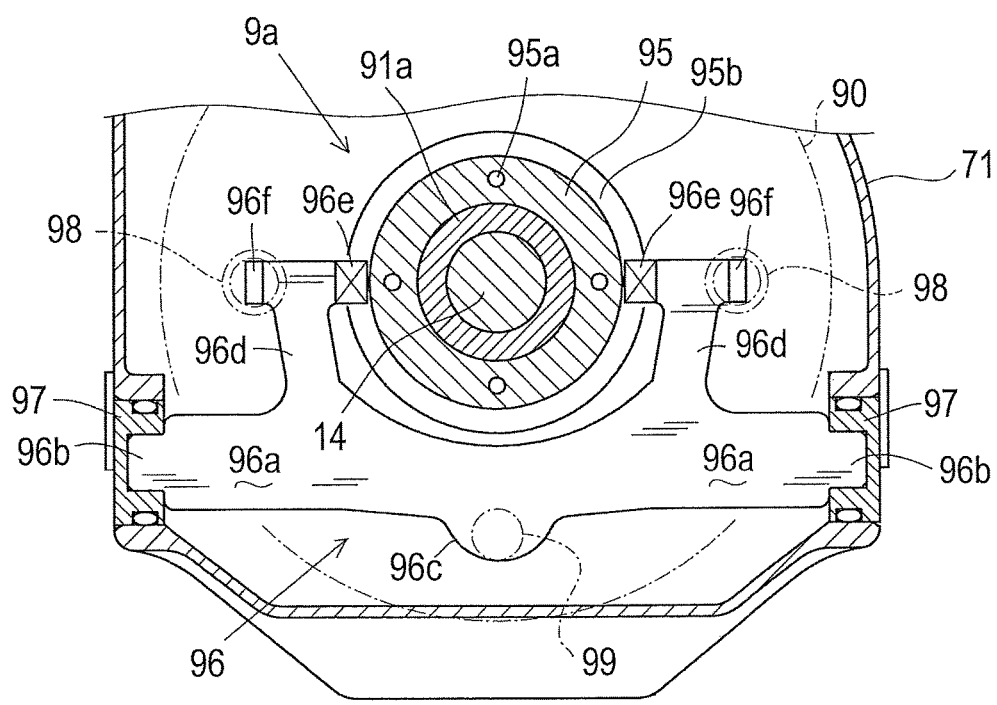
Figure 10:
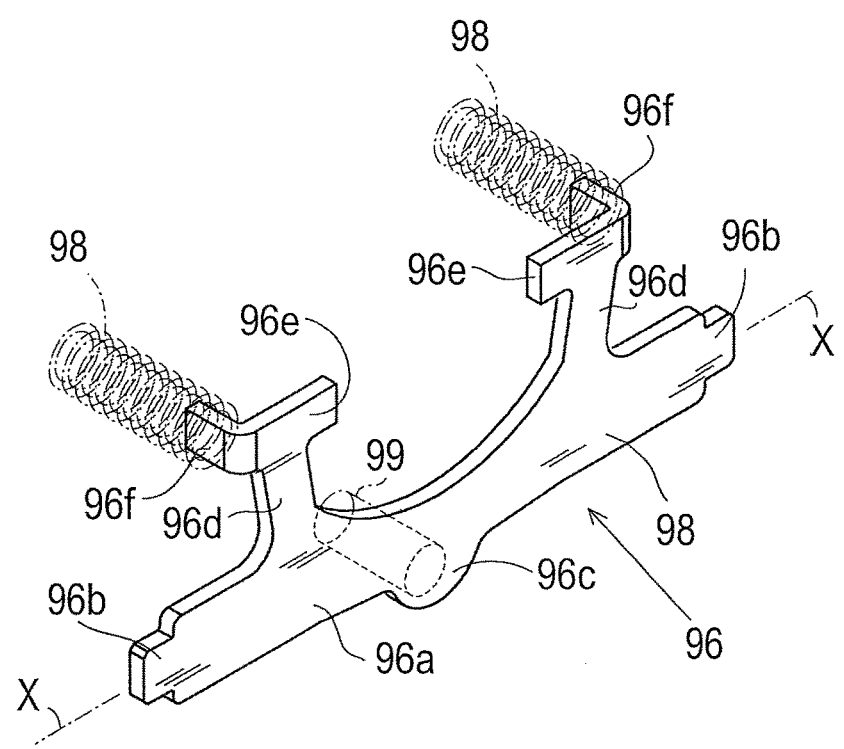
FIG. 10 is a perspective view of a differential locking fork 96.

Referring to FIGS. 3 and 9, differential locking slider 95 is formed with an annular groove 95*b*. Referring to FIGS. 9 and 10, fork pawls 96*e* formed on differential locking fork 96 are fitted into annular groove 95*b* to sandwich differential locking slider 95 therebetween.

Referring to FIGS. 3, 9 and 10, differential locking fork 96 is formed of a single plate member having a fore-and-aft extended lower portion serving as a pivotal shaft portion 96*a*. Pivotal shaft portion 96*a* is formed at front and rear ends thereof with projections 96*b*. First divisional housing 71 of rear transaxle 70 is formed in front and rear walls thereof with circular sleeve-shaped holes, into which respective bearing caps 97 are fitted as shown in FIGS. 3 and 9. Front and rear projections 96*b* of differential locking fork 96 disposed in gear chamber 70 are fitted into front and rear bearing caps 97. In this way, pivotal shaft portion 96*a* of differential locking fork 96 is spanned in the fore-and-aft direction between front and rear bearing caps 97 so that differential locking fork 96 is laterally rotatable centered on a phantom fore-and-aft axial line X passed through central portions of front and rear recesses 96*b*.

Referring to FIG. 9, differential locking fork 96 is formed with front and rear fork arm portions 96*d* that are extended upward from pivotal shaft portion 96*a* so as to have differential locking slider 95 therebetween. Front and rear fork arm portions 96*d* are formed on respective tips thereof with respective fork pawls 96*e*, which are fitted into annular groove 95*b* on differential locking slider 95 disposed between front and rear fork arm portions 96*d*. Therefore, differential locking slider 95 is connected to differential locking fork 96 so that differential locking slider 95 is slid on boss 91*a* by rotating differential locking fork 96 centered on axial line X.

Referring to FIGS. 3, 9 and 10, front and rear springs 98 are interposed between lower manifold portion 71*b* of first divisional housing 71 and differential locking fork 96. Each spring 98 is pressed at one right or left (in this embodiment, left) end thereof against lower manifold portion 71*b*, the other right or left (in this embodiment, right) end thereof against top surfaces of respective front and rear fork arm portions 96*d*. In this regard, a front end portion of the top portion of front fork arm portion 96*d* and a rear end portion of the top portion of rear fork arm portion 96*d* are bent toward lower manifold portion 71*b* so as to form respective spring retaining pawls 96*f*, which are fitted into respective springs 98, thereby locating respective springs 98. The pair of springs 98 bias respective fork arm portions 96*d* of differential locking fork 96 toward differential casing 91, thereby constantly biasing differential locking slider 95 toward the differential locking position.

A fore-and-aft intermediate portion of the lower portion of differential locking fork 96 is extended further downward from pivotal shaft portion 96*a* so as to serve as a piston contacting convex 96*c*. A portion of lower manifold portion 71*b* under bearing hole 71*c* is recessed by a cylinder hole 71*j* extended laterally to be open to gear chamber 70*a*. Piston 99 is laterally slidably fitted into cylinder hole 71*j* and projects from hole 71*j* into gear chamber 70*a* so as to have a tip pressed against piston contacting convex 96*c* of differential locking fork 96.

Referring to FIG. 5, upper and lower manifold portions 71*a* and 71*b* of first divisional housing 71 are formed so that a rear portion of lower manifold portion 71*b* is expanded rearward from a rear end of upper manifold portion 71*a* so as to form a step between a rear lower portion of upper manifold portion 71*a* and a rear upper portion of lower manifold portion 71*b*. An upwardly open recess 71*g* is formed in a top rear portion of lower manifold portion 71*b* expanded rearward from the rear end of upper manifold portion 71*a* so as to serve as a drained fluid chamber. Differential unlocking directional control valve V3 is provided in recess 71*g*, and a cover plate 71*h* is fixed to the top surface of the top rear portion of lower manifold portion 71*b* so as to cover the top opening of recess 71*g*.

Vertical fluid hole 63*g* is extended downward along the vertical rear end of upper manifold portion 71*a* to its branching portion to lateral fluid hole 63*h* extended to motor port block 40. Vertical fluid hole 63*g* is extended further downward from the branching portion so as to have its lower end in an upper portion of lower manifold portion 71*b*. In the upper portion of lower manifold portion 71*b*, a fore-and-aft fluid hole 63*i* is formed to extend rearward from the lower end of vertical fluid hole 63*g* so as to be connected to inlet port PP of directional control valve V3.

Figure 6:
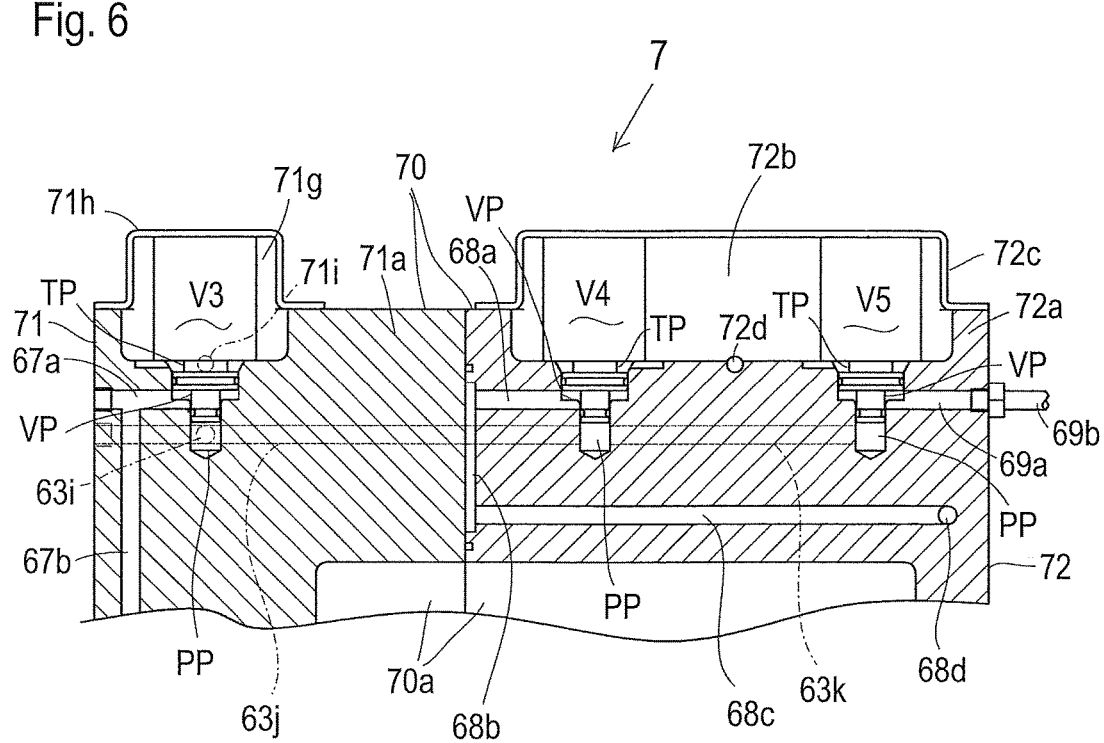
FIG. 6 is a fragmentary sectional rear view of rear transaxle 7 taken along arrowed B-B line of FIG. 3.

Drain port TP of directional control valve V3 is open to recess 71*g* serving as the drained fluid chamber, similar to those of directional control valves V1 and V2 for the auxiliary speed shift operation. Referring to FIG. 6, first divisional housing 71 is formed with a fluid drain hole 71*i* to fluidly connect recess 71*g* to gear chamber 70. Therefore, fluid drained from drain port TP of directional control valve V3 is returned to the fluid sump in gear chamber 70*a* via recess 71*g* and fluid drain hole 71*i*.

Lower manifold portion 71*b* is formed therein with a lateral fluid hole 67*a*, a vertical fluid hole 67*b*, and a fore-and-aft fluid hole 67*c*. Lateral fluid hole 67*a* is extended from valve port VP of differential unlocking directional control valve V3. Vertical fluid hole 67b is extended downward from fluid hole 67a along a rear end surface of lower manifold portion 71b. Fore-and-aft fluid hole 67c is extended from a lower end of fluid hole 67b to cylinder hole 71j. Fluid holes 67a, 67b and 67c constitute a hydraulic fluid passage 67 as shown in FIG. 12, which is interposed between valve port VP of differential unlocking directional control valve V3 and a hydraulic fluid chamber 71j1 in cylinder hole 71j for activating piston 99 serving as a differential unlocking actuator. In this way, differential unlocking hydraulic fluid passage 67 includes only the fluid holes formed in first divisional housing 71 of rear transaxle casing 70.

When directional control valve V3 is de-energized, it is located at its fluid discharge position, so that fluid is drained from hydraulic fluid chamber 71j1 in cylinder hole 71j so as to withdraw piston 99 so that differential locking fork 96 is tilted toward differential casing 91 by the biasing force of springs 98, thereby locating differential locking slider 95 at the differential locking position. When directional control valve V3 is energized, it is located at its fluid supply position, so that fluid is supplied from fluid passage 63 into hydraulic fluid chamber 71j1 via fluid passage 67 so as to thrust piston 99 with the hydraulic pressure toward differential casing 91, thereby thrusting differential locking fork 96 against springs 98. Therefore, differential locking slider 95 is located at the differential unlocking position to allow right and left differential output shafts 14 to rotate differentially.

The energization and de-energization operation of directional control valve V3 is associated with the turning on-and-off operation of the ignition switch, so that when the ignition switch is turned on, directional control valve V3 is energized to unlock differential unit 9, thereby enabling vehicle 100 to start traveling with right and left rear wheels 16 allowed to rotate differentially for smooth turning or so on.

Moreover, vehicle 100 is provided with a differential locking manipulator such as a pedal or a lever. When vehicle 100 gets stuck in a muddy place, the differential locking manipulator can be manipulated to de-energize directional control valve V3 so as to lock differential unit 9, thereby surely transmitting the driving power to both right and left rear wheels 16 for escaping the muddy place.

Further, it is conceivable that vehicle 100 is provided with a vehicle speed sensor or the like for detecting a traveling condition of vehicle 100 so that based on the detection result, a controller (not shown) judges whether differential unit 9 needs the differential locking operation or not, i.e., whether differential locking system 9a should be activated or not, thereby deciding whether directional control valve V3 is energized or de-energized. Therefore, the hydraulic control system including the electromagnetic (solenoid) valve serving as directional control valve V3 for controlling piston 99 serving as the differential unlocking hydraulic actuator can be utilized to enable automatic selection of either the differential locking state or the differential unlocking state of differential unit 9 based on the detection of the traveling condition of vehicle 100.

Figure 11:
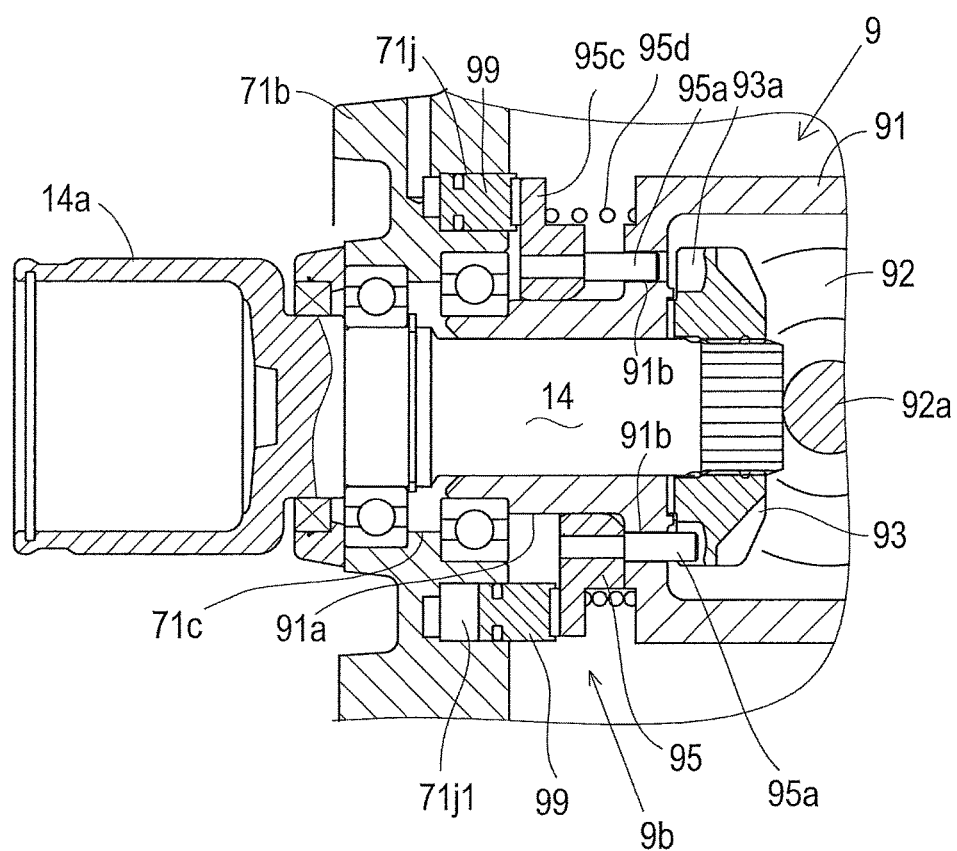
FIG. 11 is a sectional side view of differential unit 9 provided with an alternative differential locking system 9b.

Referring to FIG. 11, differential unit 9 provided with an alternative differential locking system 9b will now be described. Similar to differential locking system 9a, differential locking system 9b is configured so that differential locking pins 95a of differential locking slider 95 passed through differential casing 91 are fitted into respective recesses 93a of differential side bevel gear 93 when differential locking slider 95 is operated for differential locking.

Differential locking system 9b directly connects differential locking slider 95 to annular pistons 99 serving as hydraulic actuators without interposition of a differential locking fork such as differential locking fork 96 of differential locking system 9a. Pistons 99 are fitted into respective cylinder holes 71h that are recessed in lower manifold portion 71b of first divisional housing 71 along an outer circumferential surface of a bearing journaling differential casing 91. On the other hand, referring to FIG. 5, directional control valve V3 is provided in the top portion of lower manifold portion 71b of first divisional housing 71 so that valve port VP of directional control valve V3 is fluidly connected to cylinder holes 71j via fluid passage 67, e.g., vertical fluid hole 67b shown in FIG. 5, formed in lower manifold portion 71b.

Differential locking slider 95 of differential locking system 9b is formed with a flange 95c on an outer circumferential surface thereof so as to have a spring 95d between flange 95c and the side wall of differential casing 91, thereby being biased in the differential unlocking direction. Therefore, differential locking system 9b is configured so that differential unit 9 is set in the differential unlocking state when directional control valve V3 is de-energized. When directional control valve V3 is energized, hydraulic fluid chamber 71j1 in cylinder hole 71j is supplied with hydraulic fluid so that piston 99 thrusts differential locking slider 95 to the differential locking position against spring 95d. Incidentally, for convenience in illustration, in FIG. 11, an upper portion of differential locking slider 95 above differential output shaft 14 is illustrated as being located at the differential unlocking position, and a lower portion of differential locking slider 95 below differential output shaft 14 is illustrated as being located at the differential locking position.

Parking brake 17 on transmission output shaft 13 and a hydraulic control system for controlling parking brake 17 will be described with reference to FIGS. 3, 5, 6, 12 and others. Parking brake 17 is disposed on transmission output shaft 13 in gear chamber 70a along a vertical wall surface of second divisional housing 72 facing PTO casing 73. Parking brake 17 is an assembly including a brake drum 17a, brake discs 17b and 17c, a pressure plate 17d, a disc spring 17e, and a piston 17f.

Brake drum 17a has a cylindrical drum portion around transmission output shaft 13. Brake drum 17a is flanged at a right or left (in this embodiment, right) end portion thereof close to PTO casing 73, so that the flanged end portion of brake drum 17a is fixed to the inside wall surface of second divisional housing 72. Brake discs 17b and 17c are layered in a space between the inner circumferential surface of brake drum 17a and the outer circumferential surface of transmission output shaft 13. Brake disc 17a is engaged with brake drum 17a unrotatably relative to brake drum 17a. Brake disc 17c is engaged with transmission output shaft 13 unrotatably relative to transmission output shaft 13. Pressure plate 17d is disposed in brake drum 17a closer to hydraulic motor 4 than brake discs 17b and 17c, so that pressure plate 17d is unrotatable relative to brake drum 17a and is axially slidable along transmission output shaft 13. Disc spring 17e is disposed closer to hydraulic motor 4 than pressure plate 17d and is fitted to pressure plate 17d so as to bias pressure plate 17d in a braking direction to press pressure plate 17d against discs 17b and 17c for pressing discs 17b and 17c against each other.

Brake drum 17a is formed in the flanged end portion thereof with an annular cylinder recess 17g in which piston 17f serving as an unbraking actuator is axially slidably fitted. Piston 17f is extended in a sleeve-shape along the outer circumferential surface of transmission output shaft 13. Pressure plate 17*d* is formed with a radial projecting portion projecting radially outward from brake drum 17*a*, and a tip of piston 17*f* abuts against the radial projecting portion of pressure plate 17*d* against disc spring 17*d*.

Referring to FIG. 6, second divisional housing 72 is formed with a manifold portion 72*a* whose top surface is formed with an upwardly open recess 72*b*. Unbraking directional control valve V4 and drive mode selection directional control valve V5 are juxtaposed left and right (in this embodiment, directional control valve V4 is disposed leftward from directional control valve V5) in recess 72*b*. A cover plate 72*c* is fixed to the top surface of manifold portion 72*c* so as to cover the top opening of recess 72*b*. In lower manifold portion 71*b* of first divisional housing 71, a lateral fluid hole 63*j* is branched from fore-and-aft fluid hole 63*i* connected to inlet port PP of differential unlocking directional control valve V3 and is extended to the end of first divisional housing 71. In manifold portion 72*a* of second divisional housing 72, a lateral fluid hole 63*k* is formed to extend coaxially to fluid hole 63*j* in lower manifold portion 71*b*, is joined to fluid hole 63*j*, and is extended to pass through inlet ports PP of directional control valves V4 and V5.

Drain ports TP of respective directional control valves V4 and V5 are open to the inside of recess 72*b* serving as the drained fluid chamber. Referring to FIG. 6, a fluid drain hole 72*d* is formed in second divisional housing 72 so as to fluidly connect recess 72*b* to gear chamber 70*a*. Therefore, fluid drained from drain ports TP of respective directional control valves V4 and V5 flows to the fluid sump in gear chamber 70*a* via recess 72*b* and fluid drain hole 72*d* so as to return to the fluid sump in gear chamber 70*a*.

Referring to FIG. 6, a vertical fluid chamber 68*b* bypassing fluid hole 63*k* is formed on a surface of manifold portion 72*a* of second divisional housing 72 joined to the upper portion of lower manifold portion 71*b* of first divisional housing 71. A fluid hole 68*a* is formed in manifold portion 72*a* above fluid hole 63*k* so as to be extended laterally from valve port VP of unbraking directional control valve V4, and so as to be connected to a top portion of fluid chamber 68*b*. A fluid hole 68*c* is formed in manifold portion 72*a* below fluid hole 63*k* so as to be extended laterally from a lower end of fluid hole 63*b*. A fluid hole 68*d* is extended in the fore-and-aft direction from an end of fluid hole 68*c* so that fluid holes 68*c* and 68*d* are formed in a bent shape. A fluid hole 68*e* is formed in second divisional housing 72 so as to be open to hydraulic fluid chamber 17*g*1 as shown in FIG. 3. Fluid hole 68*e* is connected to fluid hole 68*d*. In this way, fluid hole 68*a*, fluid chamber 68*b* and fluid holes 68*c*, 68*d* and 68*e* constitute a fluid passage 68 as shown in FIG. 12 for fluidly connecting valve port VP of directional control valve V4 to hydraulic fluid chamber 17*g*1 for thrusting piston 17*f* serving as a hydraulic actuator for parking brake 17.

When directional control valve V4 is de-energized, it is located at its fluid discharge position, so that fluid is drained from hydraulic fluid chamber 71*g*1 and brake discs 17*b* and 17*c* are pressed against each other by the biasing force of disc spring 17*e*, thereby applying parking brake 17 to brake transmission output shaft 13. When directional control valve V4 is energized, it is located at its fluid supply position, so that fluid is supplied from fluid passage 63 including fluid hole 63*k* into hydraulic fluid chamber 17*g*1 via fluid passage 68 so as to thrust piston 17*f* with pressure plate 17*d* in the direction to separate brake discs 17*b* and 17*c* from each other. Therefore, parking brake 17 is released to unbrake transmission output shaft 13.

The energization and de-energization operation of directional control valve V4 is associated with the turning on-and-off operation of the ignition switch, so that when the ignition switch is turned off for parking vehicle 100, directional control valve V4 is de-energized to automatically apply parking brake 17 to stationary vehicle 100. Once the ignition switch is turned on for starting vehicle 100, directional control valve V4 is energized to automatically release parking brake 17.

Moreover, vehicle 100 is provided with a braking manipulator such as a pedal or a lever, so that when the braking manipulator is manipulated for braking, directional control valve V3 is de-energized so as to apply parking brake 17. Further, it is conceivable that vehicle 100 is provided with a sensor detecting a peripheral situation of vehicle 100 so that when a controller (not shown) monitoring the detection result from the sensor recognizes vehicle 100 as being possible to have a collision, the controller automatically de-energizes directional control valve V4 to apply parking brake 17.

Referring to FIG. 3 and others, a power train from transmission output shaft 13 to PTO shaft 18 will be described. PTO transmission shaft 75 is journalled by PTO transmission shaft housing 73*a* via a bearing 75*b* and is laterally extended coaxially to transmission output shaft 13. Second divisional housing 72 and PTO transmission shaft housing 73*a* are formed in mutually joined portions thereof with a lubricating fluid chamber 64*g* between a bearing 13*b* on transmission output shaft 13 and bearing 75*b* on PTO transmission shaft 75. A sleeve-shaped coupler 74 having a splined inner circumferential portion is disposed in lubricating fluid chamber 64*g* so that transmission output shaft 13 is connected to PTO transmission shaft 75 via coupler 74.

A structure for supplying lubricating fluid to parking brake 17 and the like on transmission output shaft 13 will now be described with reference to FIG. 3. As mentioned above, fluid hole 64*d* is open at the end portion of transmission input shaft 12. Second divisional housing 72 is formed therein with a lubricating fluid chamber 64*e* between the end portion of transmission input shaft 12 having the open end of fluid hole 64*d* and the distal side wall of second divisional housing 72. Further, second divisional housing 72 is formed therein with a lubricating fluid hole 64*f* connecting lubricating fluid chamber 64*e* to lubricating fluid chamber 64*g*. A fluid hole 64*h* is bored in transmission output shaft 13 and is open to lubricating fluid chamber 64*g* (coupler 74 may be interposed between fluid hole 64*h* and lubricating fluid chamber 64*g*). Fluid hole 64*h* is axially, i.e., laterally, extended in transmission output shaft 13, and is open to brake discs 17*b* and 17*c* of parking brake 17 on transmission output shaft 13 via a radial fluid hole (not shown) formed in transmission output shaft 13. In this way, fluid drained from fluid hole 64*d* in transmission input shaft 12 is supplied as lubricating fluid for parking brake 17.

Fluid hole 64*h* is further extended axially in transmission output shaft 13 so as to have an open end at the axial end of transmission output shaft 13 facing hydraulic motor 4 so that fluid drained from the open end of fluid hole 64*h* is returned to the fluid sump in gear chamber 70*a* via a bearing 13*c* on transmission output shaft 13.

A bevel gear 75*a* is formed (or fixed) on an axial end portion of PTO transmission shaft 75 in PTO casing 73. On the other hand, PTO shaft 18 is journalled by PTO casing 73 via front and rear bearings so as to be extended perpendicular to PTO transmission shaft 75. More specifically, a casing cover 73*b* is fixed to PTO casing 73 so as to cover a rear end opening of PTO casing 73. PTO shaft 18 is journalled at a rear end portion thereof by casing cover 73b via the rear bearing, and is journalled at a front portion thereof by a front end portion of PTO casing 73 via the front bearing. The front end portion of PTO shaft 18 projects forward from PTO casing 73 so as to be connected to propeller shaft 103.

In PTO casing 73, a bevel gear 76 is fitted on PTO shaft 18 rotatably relative to PTO shaft 18, and is journalled by a front portion of PTO casing 73 via a bearing. Bevel gear 76 meshes with bevel gear 75a on PTO transmission shaft 75. Clutch teeth 76a are formed on a rear end portion of bevel gear 76. A clutch slider 19a is fitted on PTO shaft 18 rearward from bevel gear 76 axially slidably along PTO shaft 18. Clutch teeth 77a are formed on a front end portion of clutch slider 77 so as to be able to engage with clutch teeth 76a of bevel gear 76.

Guide pins 78 are fixed to clutch slider 77 and are extended rearward from clutch slider 77. A retainer 79 is fixed (spline-fitted) on PTO shaft 18 rearward from clutch slider 77. Retainer 79 is formed therein with pin holes 79a into which respective guide pins 78 extended from clutch slider 77 are slidably inserted. Therefore, clutch slider 77 is engaged with PTO shaft 18 via guide pins 78 and retainer 79 so as to be unrotatable relative to PTO shaft 18 and axially slidable along PTO shaft 18.

Springs 78b are interposed between clutch slider 77 and retainer 79, and are wound around respective guide pins 78, so as to bias clutch slider 77 in a direction to engage clutch teeth 77a with clutch teeth 76a. Each guide pin 78 includes outer circumferential surfaces having different (large and small) diameters so as to have an annular step 78a therebetween. Step 78a can contact retainer 79 so as to restrict the slider of guide pin 78 toward retainer 79. When step 78a contacts retainer 79, clutch slider 77 is located at its clutch-off position.

PTO shaft 18 includes outer circumferential surfaces having different (large and small) outer diameters so as to have an annular step 18a therebetween. In correspondence to step 18a, clutch slider 77 includes inner circumferential surfaces having different (large and small) inner diameters so as to have an annular step 77a therebetween. Therefore, a hydraulic fluid chamber 19a shown in FIG. 12 is defined between the outer circumferential surface of PTO shaft 18 having the small outer diameter and the inner circumferential surface of clutch slider 77 having the large inner diameter and between steps 18a and 77a.

PTO shaft 18 is formed therein with a radial fluid hole 69c4 open to hydraulic fluid chamber 19a, and with an axial fluid hole 69c3 connected to fluid hole 69c4 and having an open end at the rear end of PTO shaft 18. Casing cover 73b is formed therethrough with a fluid hole 69c1 open at the inside and outside of casing cover 73b so as to correspond to the open end of fluid hole 69c3 at the rear end of PTO shaft 18. PTO casing 73 is provided therein with a fluid chamber 69c2 between the rear end of PTO shaft 18 and casing cover 73b. Therefore, fluid chamber 69c1 in casing cover 73b and fluid holes 69c3 and 69c4 in PTO shaft 18 are continuously extended between fluid hole 69c1 and hydraulic fluid chamber 19a. In this way, fluid hole 69c1, fluid chamber 69c2 and fluid holes 69c3 and 69c4 constitute a fluid passage 69c in PTO casing 73 as shown in FIG. 12. One end of fluid pipe 69b is connected to the open end of fluid hole 69c1 at the outside of casing cover 73b.

Fluid pipe 69b is interposed between casing cover 73b of PTO casing 73 and second divisional housing 72 of rear transaxle casing 70. In this regard, referring to FIG. 6, manifold portion 72a of second divisional housing 72 is formed therein with a fluid hole 69a that is extended laterally from valve port VP of directional control valve V5 so as to have an open end at an outer surface of the distal side portion of second divisional housing 72. Another end of fluid pipe 69b is connected to the open end of fluid hole 69a at the outer surface of second divisional housing 72. In this way, fluid hole 69a in second divisional housing 72 of rear transaxle casing 70, fluid pipe 69b outside of rear transaxle casing 70, and fluid passage 69c formed in PTO casing 73 constitute a fluid passage 69 as shown in FIG. 12, which fluidly connects valve port VP of directional control valve V5 to hydraulic fluid chamber 19b.

As mentioned above, PTO clutch 19 includes PTO shaft 18 (serving as a transmission shaft), gear 76 provided on PTO shaft 18 rotatably relative to PTO shaft 18, and clutch slider 77 provided on PTO shaft 18 axially slidably along PTO shaft 18 and unrotatably relative to PTO shaft 18. Respective clutch teeth 76as and 77a are provided on gear 76 and clutch slider 77. PTO clutch 19 is set in either the clutch-on state where clutch teeth 76a of gear 76 engage with clutch teeth 77a of clutch slider 77 or the clutch-off state where clutch teeth 76a of gear 76 disengage from clutch teeth 77a of clutch slider 77. PTO clutch 19 is provided with a hydraulic control system to hydraulically control the respective axial slide actions of clutch slider 77 in the clutch-on direction for realizing the clutch-on state and in the clutch-off direction for realizing the clutch-off state.

When directional control valve V5 is de-energized, it is located at its fluid discharge position, so that fluid is drained from hydraulic fluid chamber 19a and clutch slider 77 is disposed close to bevel gear 76 by the biasing force of springs 78b so as to engage its clutch teeth 77a with clutch teeth 76a of bevel gear 76, thereby engaging PTO clutch 19. In this state, step 18a of PTO shaft 18 abuts against step 77a of clutch slider 77 so as to locate clutch slider 77 at the clutch-on position. Therefore, the rotary power of transmission output shaft 13 is transmitted to PTO shaft 18 so as to set vehicle 100 in the four wheel drive mode.

When directional control valve V5 is energized, it is located at its fluid supply position, so that fluid is supplied from fluid passage 63 into hydraulic fluid chamber 19a via fluid passage 69 to thrust clutch slider 77 against springs 78b so as to disengage clutch teeth 77a from clutch teeth 76a, thereby disengaging PTO clutch 19. In this state, steps 78a of respective guide pins 78 abut against retainer 79 so as to locate clutch slider 77 at the clutch-off position. Therefore, PTO shaft 18 is isolated from the rotary power of bevel gear 76 on PTO transmission shaft 75 so as to set vehicle 100 in the two wheel drive mode.

Vehicle 100 may be provided with a manipulator, e.g., a switch, for the drive mode selection of either the four wheel drive mode or the two wheel drive mode. In this configuration, the energization and de-energization operation of drive mode selection directional control valve V5 depends on an operator's optional manipulation of the manipulator. When the four wheel drive mode is selected, directional control valve V5 is de-energized. When the two wheel drive mode is selected, directional control valve V5 is energized.

Moreover (or alternatively), vehicle 100 may be provided with a vehicle speed sensor, for example, for detecting a traveling condition of vehicle 100. In this configuration, a controller (not shown) monitoring detection results of the vehicle speed sensor judges whether the four wheel drive mode or the two wheel drive mode is appropriate for the traveling condition, and automatically energize or de-energize directional control valve V5.

Further, it is conceivable that the energization and de-energization operation of directional control valve V5 is associated with the turning on-and-off operation of the ignition switch of vehicle 100. As a result of this association, when the ignition switch is turned on, directional control valve V5 is energized to disengage PTO clutch 19, so that vehicle 100 necessarily starts traveling in the two wheel drive mode. If a traveling condition detecting device, e.g., the vehicle speed sensor or an inclination sensor, detects a traveling condition, and the controller recognizes the detected traveling condition as a state requiring vehicle 100 to be set in the four wheel drive mode, the controller automatically de-energizes directional control valve V5 so as to engage PTO clutch 19.

Further, as another result of the association of operation of directional control valve V5 with operation of the ignition switch, when the ignition switch is turned off, directional control valve V5 is de-energized to engage PTO clutch 19, so that vehicle 100 is necessarily parked in the four wheel drive mode. On the other hand, as mentioned above, when the ignition switch if turned off, directional control valve V4 is also de-energized to apply parking brake 17. Therefore, the braking force of parking brake 17 is applied to front wheels 111 as well as rear wheels 16, thereby enhancing the braking effect. Therefore, if vehicle 100 is parked on a slope, for example, vehicle 100 is surely prevented from unexpectedly descending the slope.

Alternatively, it is conceivable that, once PTO clutch 19 is engaged or disengaged to select either the four wheel drive mode or the two wheel drive mode for traveling of vehicle 100, the set engagement or disengagement state of PTO clutch 19, i.e., the set clutch-on or clutch-off position of clutch slider 77, is kept unless vehicle 100 is recognized as being stationary. In other words, the switching operation of PTO clutch 19 is enabled only when vehicle 100 is recognized as being stationary. Therefore, clutch teeth 76a and 77a are prevented from being damaged, while they might be damaged if the switching operation of the clutch were performed during traveling of vehicle 100.

Referring to FIG. 12, vehicle 100 is provided with a hydraulic PTO device 120 for taking off a rotary power synchronized to a vehicle traveling speed, and is provided with a hydraulic PTO directional control valve V6 for supplying fluid to hydraulic PTO device 120. A proportional solenoid valve is used as a proportional flow control valve serving as directional control valve V6. Basically, directional control valve V6 is shiftable between a fluid supply position, where its valve port VP connected to hydraulic PTO device 120 is connected to its inlet port PP and its drain port TP is closed, and a fluid discharge position, where valve port VP is connected to drain port TP and inlet port PP is closed. The hydraulic pressure supplied to hydraulic PTO device 120 is adjustable according to an electric current amount applied to a solenoid of directional control valve V6.

Incidentally, fluid pipe 61b extended from external hydraulic pump P2 is connected to fluid passage 63 in manifold portions 71a and 71b via inlet port 62. In the above-mentioned embodiment, inlet port 62 is provided in the wall of first divisional housing 71 attached to hydraulic motor 4. Alternatively, inlet port 62 may be provided in a wall of second divisional housing 72 opposite hydraulic motor 4, or may be provided in motor port block 40 of hydraulic motor 4.

Further, in the above-mentioned embodiment, the main parts of fluid passage 63 for supplying fluid to hydraulic fluid chambers 80a, 80b, 71j1, 17g1 and 19a via respective directional control valves V1 to V5 are collected in manifold portions 71a and 71b made of the wall of first divisional housing 71 attached to hydraulic motor 4. Alternatively, the main parts of fluid passage 63 may be collected in a wall of second divisional housing 72 opposite hydraulic motor 4.

It is further understood by those skilled in the art that the foregoing description is given to preferred embodiments of the disclosed apparatus and that various changes and modifications may be made in the invention without departing from the scope thereof defined by the following claims.

What is claimed is:

1. A clutch system comprising:

a transmission shaft;

a gear provided on the transmission shaft rotatably relative to the transmission shaft; and a clutch slider is provided on the transmission shaft axially slidably along the transmission shaft and unrotatably relative to the transmission shaft, wherein the gear and the clutch slider are provided with respective clutch teeth, wherein the clutch system is set in either a clutch-on state where the clutch teeth of the gear engage with the clutch teeth of the clutch slider or a clutch-off state where the clutch teeth of the gear disengage from the clutch teeth of the clutch slider, and wherein the clutch system is interposed between a hydraulic stepless transmission and traveling wheels, the clutch system further comprising:

first and second gears each of which serves as said gear; and first and second clutch sliders each of which serves as said clutch slider, wherein the first and second clutch sliders are disposed between the first and second gears, wherein a hydraulic control system hydraulically controls the axial slide actions of the first clutch slider in clutch-on and clutch-off directions and the axial slide actions of the second clutch slider in the clutch-on and clutch-off directions so as to realize either a first clutch-on state where the clutch teeth of the first gear engage with the clutch teeth of the first clutch slider or a second clutch-on state where the clutch teeth of the second gear engage with the clutch teeth of the second clutch slider, wherein, when the clutch system equipped on a vehicle is operated to be shifted between the first clutch-on state and the second clutch-on state during travel of the vehicle, the rotation speed of the transmission shaft is matched with the rotation speed of the first gear or the second gear which is the target first or second clutch slider to have its clutch teeth engaged after the shift operation of the clutch system by changing the output of the hydraulic stepless transmission.

2. The clutch system according to claim 1, wherein, when the clutch system equipped on the vehicle is set in either the clutch-on state or the clutch-off state, the set clutch-on or clutch-off state is kept unless the vehicle is recognized as stationary.

* * * * *